United States Patent
Fei et al.

(10) Patent No.: US 12,532,245 B2
(45) Date of Patent: Jan. 20, 2026

(54) NETWORK DEVICE ACCESSING METHOD AND APPARATUS

(71) Applicant: HUAWEI TECHNOLOGIES CO., LTD., Guangdong (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 18/190,586

(22) Filed: Mar. 27, 2023

(65) Prior Publication Data

US 2023/0232309 A1 Jul. 20, 2023

Related U.S. Application Data

(63) Continuation of application No. PCT/CN2021/118851, filed on Sep. 16, 2021.

(30) Foreign Application Priority Data

Sep. 27, 2020 (CN) .......................... 202011032886.X

(51) Int. Cl.
*H04W 48/04* (2009.01)
*H04W 8/22* (2009.01)
(Continued)

(52) U.S. Cl.
CPC ............. *H04W 48/04* (2013.01); *H04W 8/22* (2013.01); *H04W 74/0833* (2013.01); *H04W 74/0836* (2024.01)

(58) Field of Classification Search
CPC ..... H04W 48/04; H04W 48/06; H04W 48/08; H04W 48/10; H04W 48/12; H04W 48/16;
(Continued)

(56) References Cited

U.S. PATENT DOCUMENTS

| 12,408,098 B2 * | 9/2025 | Li | H04W 48/02 |
| 2014/0233448 A1 * | 8/2014 | Yun | H04W 4/06 |
| | | | 370/312 |

(Continued)

FOREIGN PATENT DOCUMENTS

| CN | 106416419 A | 2/2017 |
| CN | 110602731 A | 12/2019 |

(Continued)

OTHER PUBLICATIONS

Moderator (NTT Docomo, Inc.), "Summary on [102-e-NR-RedCap-04]," 3GPP TSG RAN WG1 #102-e, R1-2007330, e-Meeting, Aug. 17-28, 2020, 30 pages.

(Continued)

*Primary Examiner* — Jenee Holland
(74) *Attorney, Agent, or Firm* — Fish & Richardson P.C.

(57) ABSTRACT

This disclosure provides network device accessing methods and apparatuses for improving network transmission performance. One method includes: receiving first information, wherein the first information indicates whether a first-type reduced capability (REDCAP) terminal and a second-type REDCAP terminal are allowed to access a network device, wherein the first-type REDCAP terminal and the second-type REDCAP terminal operate in a same frequency range, and a number of receive antennas of the second-type REDCAP terminal is less than a number of receive antennas of the first-type REDCAP terminal, and determining based on the first information, whether to access the network device, wherein the terminal apparatus is the first-type REDCAP terminal or the second-type REDCAP terminal.

24 Claims, 6 Drawing Sheets

(51) Int. Cl.
    *H04W 8/24*        (2009.01)
    *H04W 48/06*      (2009.01)
    *H04W 48/08*      (2009.01)
    *H04W 48/10*      (2009.01)
    *H04W 48/12*      (2009.01)
    *H04W 48/16*      (2009.01)
    *H04W 74/00*      (2009.01)
    *H04W 74/0833*    (2024.01)
    *H04W 74/0836*    (2024.01)

(58) Field of Classification Search
CPC ..... H04W 8/22; H04W 8/24; H04W 74/0833; H04W 74/0836; H04W 74/004
See application file for complete search history.

(56) References Cited

U.S. PATENT DOCUMENTS

| | | | |
|---|---|---|---|
| 2020/0053811 A1 | 2/2020 | Ang et al. | |
| 2021/0068036 A1* | 3/2021 | Chun | H04W 48/02 |
| 2022/0361059 A1* | 11/2022 | He | H04W 36/0061 |
| 2022/0394594 A1* | 12/2022 | Zhang | H04W 48/08 |
| 2023/0075764 A1 | 3/2023 | Liu | |
| 2023/0087902 A1* | 3/2023 | Zheng | H04W 52/0235 |
| | | | 370/329 |
| 2023/0224797 A1* | 7/2023 | Li | H04W 48/02 |
| | | | 370/329 |
| 2023/0232417 A1* | 7/2023 | Liu | H04W 74/0833 |
| | | | 370/329 |
| 2023/0262777 A1* | 8/2023 | Mu | H04W 74/08 |
| | | | 370/329 |
| 2023/0276437 A1* | 8/2023 | Wen | H04L 5/0012 |
| | | | 370/329 |
| 2023/0292364 A1* | 9/2023 | Mu | H04W 74/0891 |
| 2023/0309149 A1* | 9/2023 | Zhang | H04W 74/0833 |
| 2023/0328575 A1* | 10/2023 | Jung | H04W 28/0215 |
| | | | 370/230 |
| 2023/0354346 A1* | 11/2023 | Mu | H04L 5/0091 |
| 2024/0008050 A1* | 1/2024 | Zhou | H04W 72/231 |
| 2024/0015796 A1* | 1/2024 | Fehrenbach | H04W 74/0833 |
| 2024/0031909 A1* | 1/2024 | Yue | H04W 48/08 |
| 2024/0284273 A1* | 8/2024 | Xie | H04W 48/16 |
| 2024/0306210 A1* | 9/2024 | Guo | H04W 74/002 |
| 2024/0314823 A1* | 9/2024 | Zhao | H04W 72/51 |
| 2024/0389152 A1* | 11/2024 | Höglund | H04W 74/0866 |
| 2025/0280452 A1* | 9/2025 | Lee | H04W 74/0833 |

FOREIGN PATENT DOCUMENTS

| | | |
|---|---|---|
| CN | 111345072 A | 6/2020 |
| CN | 111567126 A | 8/2020 |
| CN | 114286418 A | 4/2022 |
| WO | 2016025836 A1 | 2/2016 |
| WO | 2019196689 A1 | 10/2019 |
| WO | 2021230726 A1 | 11/2021 |

OTHER PUBLICATIONS

Huawei et al., "Other aspects for reduced capability devices," 3GPP TSG RAN WG1 #103-e, R1-2008329, E-meeting, Oct. 26-Nov. 13, 2020, 4 pages.
Office Action in Japanese Appln. No. 2023-519401, mailed on Mar. 19, 2024, 13 pages (with English translation).
Vivo et al., "Discussion on complexity reduction for Reduced Capability NR devices," 3GPP TSG RAN WG1 #102-e, R1-2005383, e-Meeting, Aug. 17-28, 2020, 9 pages.
Qualcomm Inc., "Identification and access restriction for RedCap UEs," 3GPP TSG RAN WG2 Meeting #111e R2-2006606, Online, Aug. 17-28, 2020, 2 pages.
MediaTek Inc., "On UE identification and access restrictions," 3GPP TSG RAN WG2 Meeting #111e, R2-2007493, Online, Aug. 17-28, 2020, 3 pages.
Vivo et al., "Identification and access restrictions for RedCap UEs," 3GPP TSG RAN WG2 Meeting #111-e, R2-2006692, Electronic, Aug. 17-28, 2020, 5 pages.
Lenovo et al., "Discussion on the identification of Redcap," 3GPP TSG RAN WG2 Meeting RAN2#111 electronic, R2-2007480, Online, Aug. 17-28, 2020, 2 pages.
LG Electronics, "Consideration on the framework to support reduced capability NR devices," 3GPP TSG RAN WG1 Meeting #101, R1-2004024, e-meeting, May 25-Jun. 5, 2020, 4 pages.
3GPP TS 38.331 V16.1.0, "3rd Generation Partnership Project; Technical Specification Group Radio Access Network; NR; Radio Resource Control (RRC) protocol specification (Release 16)," Jul. 2020, 911 pages.
3GPP TS 38.306 V15.10.0, "3rd Generation Partnership Project; Technical Specification Group Radio Access Network; NR; User Equipment (UE) radio access capabilities (Release 15)," Jul. 2020, 66 pages.
3GPP TS 38.304 V15.7.0, "3rd Generation Partnership Project; Technical Specification Group Radio Access Network; NR; User Equipment (UE) procedures in Idle mode and RRC Inactive state (Release 15)," Jul. 2020, 30 pages.
International Search Report and Written Opinion in International Appln. No. PCT/CN2021/118851, mailed on Dec. 7, 2021, 18 pages (with English translation).
Moderator (Intel Corporation), "Summary on [102-e-NR-RedCap-05]," 3GPP TSG RAN WG1 Meeting #102-E, R1-2007283, e-Meeting, Aug. 17-28, 2020, 26 pages.
Intel Corporation, "Summary of discussion [109][Redcap] Reduced capability signalling framework (Intel)," 3GPP TSG-RAN WG2 Meeting #111 electronic, R2-2008191, Elbonia, Aug. 17-28, 2020, 27 pages.
Huawei, "Summary of offline 110—Identification and access restriction," 3GPP TSG-RAN WG2 Meeting#111-e, R2-2008192, Online, Aug. 17-28, 2020, 19 pages.
CMCC, "Discussion on network access control of RedCap devices," 3GPP TSG RAN WG1 #104-e, R1-2101051, e-Meeting, Jan. 25-Feb. 5, 2021, 3 pages.
Vivo et al., "Framework and Principles for Reduced Capability NR devices," 3GPP TSG RAN WG1 #102-e, R1-2005386, e-Meeting, Aug. 17-28, 2020, 5 pages.
Extended European Search Report in European Appln. No. 21871406.1, mailed on Feb. 27, 2024, 15 pages.
ZTE Corporation et al., "Redcap UE identification and access control," 3GPP TSG-RAN WG2 Meeting #111 electronic, R2-2006904, 4 pages.

* cited by examiner

NETWORK DEVICE ACCESSING METHOD AND APPARATUS

CROSS-REFERENCE TO RELATED APPLICATIONS

This application is a continuation of International Application No. PCT/CN2021/118851, filed on Sep. 16, 2021, which claims priority to Chinese Patent Application No. 202011032886.X, filed on Sep. 27, 2020. The disclosures of the aforementioned applications are hereby incorporated by reference in their entireties.

TECHNICAL FIELD

This application relates to the wireless communication field, and in particular, to a network device accessing method and an apparatus.

BACKGROUND

In a new radio (new radio, NR) system, a network device (for example, a base station) broadcasts a synchronization signal/physical broadcast channel block (SSB). If a terminal apparatus expects to access a network to obtain a wireless communication service, the terminal apparatus receives the SSB, and obtains system information based on the SSB. The system information indicates whether the terminal apparatus is allowed to access the network. If the system information indicates that the terminal apparatus is allowed to access the network, the terminal apparatus subsequently accesses the network through a random access procedure. If the system information indicates that the terminal apparatus is forbidden to access the network, the terminal apparatus cannot access the network.

Currently, in the NR system, a new type of terminal apparatus, namely, a reduced capability (REDCAP) terminal, is considered to be introduced. Compared with a common terminal for which whether network access is allowed is indicated in the SSB, the REDCAP terminal has a longer battery life, lower complexity, and lower costs. Therefore, the REDCAP terminal can be widely applied. However, the REDCAP terminal has a narrower bandwidth or fewer receive antennas than the foregoing common terminal. As a result, the REDCAP terminal has a lower transmission capability than the common terminal. If a large number of REDCAP terminals access a network, overall transmission performance of the network deteriorates. For example, average spectral efficiency of the network decreases.

SUMMARY

This application provides a network device accessing method and an apparatus, to control a number of REDCAP terminals accessing a network device, and improve network transmission performance.

To achieve the foregoing objectives, the following technical solutions are used in embodiments of this application.

According to a first aspect, an embodiment of this application provides a network device accessing method. The method includes: A terminal apparatus receives first information from a network device, where the first information indicates whether a REDCAP terminal is allowed to access the network device, and the REDCAP terminal includes a first-type REDCAP terminal and a second-type REDCAP terminal, where the first-type REDCAP terminal and the second-type REDCAP terminal operate in a same frequency range, and a bandwidth of the second-type REDCAP terminal is less than that of the first-type REDCAP terminal and/or a number of receive antennas of the second-type REDCAP terminal is less than that of the first-type REDCAP terminal; and the terminal apparatus determines, based on the first information, whether to access the network device, where the terminal apparatus is the first-type REDCAP terminal or the second-type REDCAP terminal.

According to the method provided in the first aspect, the terminal apparatus may receive, from the network device, the first information indicating whether the first-type REDCAP terminal is allowed to access the network device and whether the second-type REDCAP terminal is allowed to access the network device, and determine, based on the first information, whether to access the network device. In this way, the network device can control a number of first-type REDCAP terminals and second-type REDCAP terminals that access the network device, to ensure transmission performance of a network managed by the network device.

In a possible implementation, the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device. Based on the foregoing method, the first indication information and the second indication information may respectively indicate whether the first-type REDCAP terminal is allowed to access the network device and whether the second-type REDCAP terminal is allowed to access the network. Alternatively, the first indication information and the second indication information may jointly indicate whether the first-type REDCAP terminal is allowed to access the network device and whether the second-type REDCAP terminal is allowed to access the network. Indication manners are flexible.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional physical broadcast channel (PBCH) payload; or the first indication information includes an cellBarred field in a MIB, and the second indication information includes a spare field in the MIB, includes a reserved field in an additional PBCH payload (additional PBCH payload/additional timing related PBCH payload bits), or includes a field other than the MIB in a PBCH. Based on the foregoing method, the first indication information and the second indication information may separately indicate whether the first-type REDCAP terminal is allowed to access the network device. The indication is clear and convenient.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload. Based on the foregoing method, whether the first-type REDCAP terminal is allowed to access the network device affects whether the second-type REDCAP terminal is allowed to access the network device. Therefore, priorities of the first-type REDCAP terminal and the second-type REDCAP terminal for accessing the network device may be distinguished, to ensure that a terminal type with a higher priority preferentially accesses the network device.

In a possible implementation, the first information is included in an SSB, and the SSB includes the MIB and the additional PBCH payload. Based on the foregoing method, the network device may indicate, by using the MIB and the additional PBCH payload in the SSB, whether the REDCAP terminal is allowed to access the network device.

In a possible implementation, the first indication information is included in a reserved field in downlink control information (DCI), and the second indication information is included in the reserved field in a DCI; the first indication information is included in a reserved field in DCI, and the second indication information is included in a system information block type 1 (SIB1) information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1. Based on the foregoing method, the network device may indicate, by using the reserved field in the DCI and/or the SIB1 information block, whether the REDCAP terminal is allowed to access the network device.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1. Based on the foregoing method, the network device may indicate, by using the SSB and the reserved field in the DCI, whether the REDCAP terminal is allowed to access the network device, or the network device may indicate, by using the SSB and the SIB1 information block, whether the REDCAP terminal is allowed to access the network device.

In a possible implementation, the first information indicates that the first-type REDCAP terminal and/or the second-type REDCAP terminal are/is allowed to access the network device. The method further includes: The terminal apparatus sends second information to the network device, where the second information indicates that the terminal apparatus is the first-type REDCAP terminal or the second-type REDCAP terminal. Based on the foregoing method, the terminal apparatus may report a type of the terminal apparatus to the network device in the second information. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a physical random access channel (PRACH), a resource of the PRACH corresponds to the first-type REDCAP terminal or the second-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or radio resource control (RRC) signaling. Based on the foregoing method, the terminal apparatus may report the type of the terminal apparatus to the network device by using a plurality of methods such as the PRACH resource, the Msg3, the MsgA, or the RRC signaling, so that the network device identifies the type of the terminal apparatus.

In a possible implementation, the first information indicates that the first-type REDCAP terminal and the second-type REDCAP terminal are allowed to access the network device. The method further includes: The terminal apparatus sends second information to the network device, where the second information indicates that the terminal apparatus is a REDCAP terminal; and the terminal apparatus sends third information to the network device, where the third information indicates that the terminal apparatus is the first-type REDCAP terminal or the second-type REDCAP terminal. Based on the foregoing method, the terminal apparatus may report the type of the terminal apparatus to the network device in the second information and the third information, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling. Based on the foregoing method, the first-type REDCAP terminal can share the PRACH resource with the second-type REDCAP terminal. In this way, excessive division of the PRACH resource can be avoided, that is, excessive reduction of a random access capacity is avoided.

According to a second aspect, an embodiment of this application provides a network device accessing method. The method includes: A network device determines first information, where the first information indicates whether a REDCAP terminal is allowed to access the network device, and the REDCAP terminal includes a first-type REDCAP terminal and a second-type REDCAP terminal, where the first-type REDCAP terminal and the second-type REDCAP terminal operate in a same frequency range, and a bandwidth of the second-type REDCAP terminal is less than that of the first-type REDCAP terminal and/or a number of receive antennas of the second-type REDCAP terminal is less than that of the first-type REDCAP terminal; and the network device sends the first information to a terminal apparatus.

According to the method provided in the second aspect, the network device may determine the first information indicating whether the first-type REDCAP terminal is allowed to access the network device and whether the second-type REDCAP terminal is allowed to access the network device, and send the first information to the terminal apparatus. In this way, the network device can control a number of first-type REDCAP terminals and second-type REDCAP terminals that access the network device, to ensure transmission performance of a network managed by the network device.

In a possible implementation, the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device. Based on the foregoing method, the first indication information and the second indication information may respectively indicate whether the first-type REDCAP terminal is allowed to access the network device and whether the second-type REDCAP terminal is allowed to access the network. Alternatively, the first indication information and the second indication information may jointly indicate whether the first-type REDCAP terminal is allowed to access the network device and whether the second-type REDCAP terminal is allowed to access the network. Indication manners are flexible.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload. Based on the foregoing method, the first indication information and the second indication information may separately indicate whether the first-type REDCAP terminal is allowed to access the network device. The indication is clear and convenient.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload. Based on the foregoing method, whether the first-type REDCAP terminal is allowed to access the network device affects whether the second-type REDCAP terminal is allowed to access the network device. Therefore, priorities of the first-type REDCAP terminal and the second-type REDCAP terminal for accessing the network device may be distinguished, to ensure that a terminal type with a higher priority preferentially accesses the network device.

In a possible implementation, the first information is included in an SSB, and the SSB includes the MIB and the additional PBCH payload. Based on the foregoing method, the network device may indicate, by using the MIB and the additional PBCH payload in the SSB, whether the REDCAP terminal is allowed to access the network device.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1. Based on the foregoing method, the network device may indicate, by using the reserved field in the DCI and/or the SIB1 information block, whether the REDCAP terminal is allowed to access the network device.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1. Based on the foregoing method, the network device may indicate, by using the SSB and the reserved field in the DCI, whether the REDCAP terminal is allowed to access the network device, or the network device may indicate, by using the SSB and the SIB1 information block, whether the REDCAP terminal is allowed to access the network device.

In a possible implementation, the first information indicates that the first-type REDCAP terminal and/or the second-type REDCAP terminal are/is allowed to access the network device. The method further includes: receiving, by the network device, second information from the terminal apparatus, where the second information indicates that the terminal apparatus is the first-type REDCAP terminal or the second-type REDCAP terminal. Based on the foregoing method, the network device may receive the second information from the terminal apparatus, and determine, by using the second information, that the terminal apparatus is the first-type REDCAP terminal or the second-type REDCAP terminal. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the first-type REDCAP terminal or the second-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling. Based on the foregoing method, the network device may determine a type of the terminal apparatus by using a plurality of methods such as the PRACH resource, the Msg3, the MsgA, or the RRC signaling.

In a possible implementation, the first information indicates that the first-type REDCAP terminal and the second-type REDCAP terminal are allowed to access the network device. The method further includes: The network device receives second information from the terminal apparatus, where the second information indicates that the terminal apparatus is a REDCAP terminal; and the network device receives third information from the terminal apparatus, where the third information indicates that the terminal apparatus is the first-type REDCAP terminal or the second-type REDCAP terminal. Based on the foregoing method, the network device may determine, by using the second information and the third information, that the terminal apparatus is the first-type REDCAP terminal or the second-type REDCAP terminal. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling. Based on the foregoing method, the network device may determine the type of the terminal apparatus by combining the PRACH resource with the Msg3, the MsgA, or the RRC signaling.

According to a third aspect, an embodiment of this application provides a communication apparatus, to implement the method according to any one of the first aspect or the possible implementations of the first aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to a fourth aspect, an embodiment of this application provides a communication apparatus, to implement the method according to any one of the second aspect or the possible implementations of the second aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a fifth aspect, an embodiment of this application provides a communication apparatus, including a processor, where the processor is coupled to a memory, and the memory is configured to store a program or instructions. When the program or the instructions are executed by the processor, the apparatus is enabled to implement the method according to any one of the first aspect or the possible implementations of the first aspect.

According to a sixth aspect, an embodiment of this application provides a communication apparatus, including a processor, where the processor is coupled to a memory, and the memory is configured to store a program or instructions. When the program or the instructions are executed by the processor, the apparatus is enabled to implement the method according to any one of the second aspect or the possible implementations of the second aspect.

According to a seventh aspect, an embodiment of this application provides a communication apparatus. The apparatus is configured to implement the method according to any one of the first aspect or the possible implementations of the first aspect.

According to an eighth aspect, an embodiment of this application provides a communication apparatus. The apparatus is configured to implement the method according to any one of the second aspect or the possible implementations of the second aspect.

According to a ninth aspect, an embodiment of this application provides a computer-readable medium. The computer-readable medium stores a computer program or instructions. When the computer program or the instructions are executed, a computer is enabled to perform the method according to any one of the first aspect or the possible implementations of the first aspect.

According to a tenth aspect, an embodiment of this application provides a computer-readable medium. The computer-readable medium stores a computer program or instructions. When the computer program or the instructions are executed, a computer is enabled to perform the method according to any one of the second aspect or the possible implementations of the second aspect.

According to an eleventh aspect, an embodiment of this application provides a computer program product. The computer program product includes computer program code. When the computer program code is run on a computer, the computer is enabled to perform the method according to any one of the first aspect or the possible implementations of the first aspect.

According to a twelfth aspect, an embodiment of this application provides a computer program product. The computer program product includes computer program code. When the computer program code is run on a computer, the computer is enabled to perform the method in any one of the second aspect or the possible implementations of the second aspect.

According to a thirteenth aspect, an embodiment of this application provides a chip, including a processor. The processor is coupled to a memory, the memory is configured to store a program or instructions. When the program or the instructions are executed by the processor, the chip is enabled to implement the method according to any one of the first aspect or the possible implementations of the first aspect.

According to a fourteenth aspect, an embodiment of this application provides a chip, including a processor. The processor is coupled to a memory, and the memory is configured to store a program or instructions. When the program or the instructions are executed by the processor, the chip is enabled to implement the method according to any one of the second aspect or the possible implementations of the second aspect.

According to a fifteenth aspect, an embodiment of this application provides a communication system. The system includes the apparatus according to the third aspect and/or the apparatus according to the fourth aspect, the system includes the apparatus according to the fifth aspect and/or the apparatus according to the sixth aspect, or the system includes the apparatus according to the seventh aspect and/or the apparatus according to the eighth aspect.

It may be understood that any communication apparatus, chip, computer-readable medium, computer program product, communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

According to a sixteenth aspect, an embodiment of this application provides a network device accessing method. The method includes: A terminal apparatus receives first information from a network device, where the first information indicates whether a REDCAP terminal is allowed to access the network device, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal; and the terminal apparatus determines, based on the first information, whether to access the network device, where the terminal apparatus is the first-type REDCAP terminal, the second-type REDCAP terminal, or the third-type REDCAP terminal.

According to the method provided in the sixteenth aspect, the terminal apparatus may receive, from the network device, the first information indicating whether the first-type REDCAP terminal is allowed to access the network device and whether the second-type REDCAP terminal is allowed to access the network device, or receive, from the network device, the first information indicating whether the third-type REDCAP terminal is allowed to access the network device; and determine, based on the first information, whether to access the network device. In this way, the network device can control a number of first-type REDCAP terminals and second-type REDCAP terminals that access the network device or a number of third-type REDCAP terminals that access the network device, to ensure transmission performance of a network managed by the network device.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device. Based on the foregoing method, the first indication information and the second indication information may respectively indicate whether the first-type REDCAP terminal is allowed to access the network device and whether the second-type REDCAP terminal is allowed to access the network. Alternatively, the first indication information and the second indication information may jointly indicate whether the first-type REDCAP terminal is allowed to access the network device and whether the second-type REDCAP terminal is allowed to access the network. Indication manners are flexible.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload. Based on the foregoing method, the first indication information and the second indication information may separately indicate whether the first-type REDCAP terminal is allowed to access the network device. The indication is clear and convenient.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload. Based on the foregoing method, whether the first-type REDCAP terminal is allowed to access the network device affects whether the second-type REDCAP terminal is allowed to access the network device. Therefore, priorities of the first-type REDCAP terminal and the second-type REDCAP terminal for accessing the network device may be distinguished, to ensure that a terminal type with a higher priority preferentially accesses the network device.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1. Based on the foregoing method, the network device may indicate, by using the reserved field in the DCI and/or the SIB1 information block, whether the REDCAP terminal is allowed to access the network device.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1. Based on the foregoing method, the network device may indicate, by using the SSB and the reserved field in the DCI, whether the REDCAP terminal is allowed to access the network device, or the network device may indicate, by using the SSB and the SIB1 information block, whether the REDCAP terminal is allowed to access the network device.

In a possible implementation, the REDCAP terminal includes the third-type REDCAP terminal; and the first information includes third indication information, where the third indication information indicates whether the third-type REDCAP terminal is allowed to access the network device. Based on the foregoing method, the network device may indicate, by using the third indication information, whether the third-type REDCAP terminal is allowed to access the network device.

In a possible implementation, the third indication information includes a spare field in a MIB; or the third indication information includes an cellBarred field in the MIB. Based on the foregoing method, the network device may indicate, by using the spare field in the MIB, whether the third-type REDCAP terminal is allowed to access the network device, or may indicate, by using the cellBarred field in the MIB, whether the third-type REDCAP terminal is allowed to access the network device. Indication manners are flexible.

In a possible implementation, the first information is included in an SSB, and the SSB includes the MIB and the additional PBCH payload. Based on the foregoing method, the network device may indicate, by using the MIB and the additional PBCH payload in the SSB, whether the REDCAP terminal is allowed to access the network device.

In a possible implementation, the third indication information is included in a reserved field in DCI, or the third indication information is included in a SIB1 information block. Based on the foregoing method, the network device may indicate, by using the reserved field in the DCI, whether the third-type REDCAP terminal is allowed to access the network device, or may indicate, by using the SIB1 information block, whether the third-type REDCAP terminal is allowed to access the network device. Indication manners are flexible.

In a possible implementation, the first information indicates that the first-type REDCAP terminal, the second-type REDCAP terminal, or the third-type REDCAP terminal is allowed to access the network device, or the first information indicates that the first-type REDCAP terminal and the second-type REDCAP terminal are allowed to access the network device. The method further includes: The terminal apparatus sends second information to the network device, where the second information indicates that the terminal apparatus is the first-type REDCAP terminal, the second-type REDCAP terminal, or the third-type REDCAP terminal. Based on the foregoing method, the terminal apparatus may report a type of the terminal apparatus to the network device in the second information. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling. Based on the foregoing method, the terminal apparatus may report the type of the terminal apparatus to the network device by using a plurality of methods such as the PRACH resource, the Msg3, the MsgA, or the RRC signaling, so that the network device identifies the type of the terminal apparatus.

In a possible implementation, the first information indicates that the first-type REDCAP terminal and the second-type REDCAP terminal are allowed to access the network device. The method further includes: The terminal apparatus sends second information to the network device, where the second information indicates that the terminal apparatus is a REDCAP terminal; and the terminal apparatus sends third information to the network device, where the third information indicates that the terminal apparatus is the first-type REDCAP terminal or the second-type REDCAP terminal. Based on the foregoing method, the terminal apparatus may report the type of the terminal apparatus to the network device in the second information and the third information, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling. Based on the foregoing method, the first-type REDCAP terminal can share the PRACH resource with the second-type REDCAP terminal. In this way, excessive division of the PRACH resource can be avoided, that is, excessive reduction of a random access capacity is avoided.

According to a seventeenth aspect, an embodiment of this application provides a network device accessing method. The method includes: A network device determines first information, where the first information indicates whether a REDCAP terminal is allowed to access the network device, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal; and the network device sends the first information to a terminal apparatus.

According to the method provided in the seventeenth aspect, the network device may determine the first information indicating whether the first-type REDCAP terminal is allowed to access the network device and whether the second-type REDCAP terminal is allowed to access the network device, or determine the first information indicating whether the third-type REDCAP terminal is allowed to access the network device; and send the first information to the terminal apparatus. In this way, the network device can control a number of first-type REDCAP terminals and second-type REDCAP terminals that access the network device, to ensure transmission performance of a network managed by the network device.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device. Based on the foregoing method, the first indication information and the second indication information may respectively indicate whether the first-type REDCAP terminal is allowed to access the network device and whether the second-type REDCAP terminal is allowed to access the network. Alternatively, the first indication information and the second indication information may jointly indicate whether the first-type REDCAP terminal is allowed to access the network device and whether the second-type REDCAP terminal is allowed to access the network. Indication manners are flexible.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload. Based on the foregoing method, the first indication information and the second indication information may separately indicate whether the first-type REDCAP terminal is allowed to access the network device. The indication is clear and convenient.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload. Based on the foregoing method, whether the first-type REDCAP terminal is allowed to access the network device affects whether the second-type REDCAP terminal is allowed to access the network device. Therefore, priorities of the first-type REDCAP terminal and the second-type REDCAP terminal for accessing the network device may be distinguished, to ensure that a terminal type with a higher priority preferentially accesses the network device.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1. Based on the foregoing method, the network device may indicate, by using the reserved field in the DCI and/or the SIB1 information block, whether the REDCAP terminal is allowed to access the network device.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1. Based on the foregoing method, the network device may indicate, by using the SSB and the reserved field in the DCI, whether the REDCAP terminal is allowed to access the network device, or the network device may indicate, by using the SSB and the SIB1 information block, whether the REDCAP terminal is allowed to access the network device.

In a possible implementation, the REDCAP terminal includes the third-type REDCAP terminal; and the first information includes third indication information, where the third indication information indicates whether the third-type REDCAP terminal is allowed to access the network device. Based on the foregoing method, the network device may indicate, by using the third indication information, whether the third-type REDCAP terminal is allowed to access the network device.

In a possible implementation, the third indication information includes a spare field in a MIB; or the third indication information includes an cellBarred field in the MIB. Based on the foregoing method, the network device may indicate, by using the spare field in the MIB or the cellBarred field in the MIB, whether the third-type REDCAP terminal is allowed to access the network device. Indication manners are flexible.

In a possible implementation, the first information is included in an SSB, and the SSB includes the MIB and the additional PBCH payload. Based on the foregoing method, the network device may indicate, by using the MIB and the additional PBCH payload in the SSB, whether the REDCAP terminal is allowed to access the network device.

In a possible implementation, the third indication information is included in a reserved field in DCI, or the third indication information is included in a SIB1 information block. Based on the foregoing method, the network device may indicate, by using the reserved field in the DCI, whether the third-type REDCAP terminal is allowed to access the network device, or may indicate, by using the SIB1 information block, whether the third-type REDCAP terminal is allowed to access the network device. Indication manners are flexible.

In a possible implementation, the first information indicates that the first-type REDCAP terminal, the second-type REDCAP terminal, or the third-type REDCAP terminal is allowed to access the network device; or the first information indicates that the first-type REDCAP terminal and the second-type REDCAP terminal are allowed to access the network device. The method further includes: The network device receives second information from the terminal apparatus, where the second information indicates that the terminal apparatus is the first-type REDCAP terminal, the second-type REDCAP terminal, or the third-type REDCAP terminal. Based on the foregoing method, the network device may receive the second information from the terminal apparatus, and determine, by using the second information, that the terminal apparatus is the first-type REDCAP terminal or the second-type REDCAP terminal. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling. Based on the foregoing method, the network device may determine a type of the terminal apparatus by using a plurality of methods such as the PRACH resource, the Msg3, the MsgA, or the RRC signaling.

In a possible implementation, the first information indicates that the first-type REDCAP terminal and the second-type REDCAP terminal are allowed to access the network device. The method further includes: The network device receives second information from the terminal apparatus, where the second information indicates that the terminal apparatus is a REDCAP terminal; and the network device receives third information from the network device, where the third information indicates that the terminal apparatus is the first-type REDCAP terminal or the second-type REDCAP terminal. Based on the foregoing method, the network device may determine, by using the second information and the third information, that the terminal apparatus is the first-type REDCAP terminal or the second-type REDCAP terminal. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling. Based on the foregoing method, the network device may determine the type of the terminal apparatus by combining the PRACH resource with the Msg3, the MsgA, or the RRC signaling.

According to an eighteenth aspect, an embodiment of this application provides a communication apparatus, where the communication apparatus includes a receiving module and a processing module. The receiving module is configured to receive first information from a network device, where the first information indicates whether a REDCAP terminal is allowed to access the network device, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal. The processing module is configured to determine, based on the first information, whether to access the network device, where the communication apparatus is the first-type REDCAP terminal, the second-type REDCAP terminal, or the third-type REDCAP terminal.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1.

In a possible implementation, the REDCAP terminal includes the third-type REDCAP terminal; and the first information includes third indication information, where the third indication information indicates whether the third-type REDCAP terminal is allowed to access the network device.

In a possible implementation, the third indication information includes a spare field in a MIB; or the third indication information includes an cellBarred field in the MIB.

In a possible implementation, the first information is included in an SSB, and the SSB includes the MIB and the additional PBCH payload.

In a possible implementation, the third indication information is included in a reserved field in DCI, or the third indication information is included in a SIB1 information block.

In a possible implementation, the first information indicates that the first-type REDCAP terminal, the second-type REDCAP terminal, or the third-type REDCAP terminal is allowed to access the network device; or the first information indicates that the first-type REDCAP terminal and the second-type REDCAP terminal are allowed to access the network device. The communication apparatus further includes a sending module. The sending module is configured to send second information to the network device, where the second information indicates that the communication apparatus is the first-type REDCAP terminal, the second-type REDCAP terminal, or the third-type REDCAP terminal.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the network device. The sending module is further configured to send second information to the network device, where the second information indicates that the communication apparatus is a REDCAP terminal. The sending module is further configured to send third information to the network device, where the third information indicates that the communication apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

According to a nineteenth aspect, an embodiment of this application provides a communication apparatus, where the communication apparatus includes a processing module and a sending module. The processing module is configured to determine first information, where the first information indicates whether a REDCAP terminal is allowed to access the communication apparatus, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal. The sending module is configured to send the first information to a terminal apparatus.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the communication apparatus, and the second indication information indicates whether the second-type REDCAP terminal is allowed to access the communication apparatus; or the first indication information indicates whether the first-type REDCAP terminal is allowed to access the communication apparatus, and the first indication information and the second indication information indicate whether the second-type REDCAP terminal is allowed to access the communication apparatus.

In a possible implementation, the first indication information indicates whether the first-type REDCAP terminal is allowed to access the communication apparatus, and the second indication information indicates whether the second-type REDCAP terminal is allowed to access the communication apparatus; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the communication apparatus, and the first indication information and the second indication information indicate whether the second-type REDCAP terminal is allowed to access the communication apparatus; and the first indication information includes a spare field in a MIB, and the second indication information includes a reserved field in an additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1.

In a possible implementation, the REDCAP terminal includes the third-type REDCAP terminal; and the first information includes third indication information, where the third indication information indicates whether the third-type REDCAP terminal is allowed to access the communication apparatus.

In a possible implementation, the third indication information includes a spare field in a MIB; or the third indication information includes an cellBarred field in the MIB.

In a possible implementation, the first information is included in an SSB, and the SSB includes the MIB and the additional PBCH payload.

In a possible implementation, the third indication information is included in a reserved field in DCI, or the third indication information is included in a SIB1 information block.

In a possible implementation, the first information indicates that the first-type REDCAP terminal, the second-type REDCAP terminal, or the third-type REDCAP terminal is allowed to access the communication apparatus, or the first information indicates that the first-type REDCAP terminal and the second-type REDCAP terminal are allowed to access the communication apparatus. The communication apparatus further includes a receiving module. The receiving module is configured to receive second information from the terminal apparatus, where the second information indicates that the terminal apparatus is the first-type REDCAP terminal, the second-type REDCAP terminal, or the third-type REDCAP terminal.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the communication apparatus. The receiving module is further configured to receive second information from the terminal apparatus, where the second information indicates that the terminal apparatus is a REDCAP terminal. The receiving module is further configured to receive third information from the communication apparatus, where the third information indicates that the terminal apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

According to a twentieth aspect, an embodiment of this application provides a communication apparatus, including a processor. The processor is coupled to a memory, and the memory is configured to store a program or instructions. When the program or the instructions are executed by the processor, the apparatus is enabled to implement the method according to any one of the sixteenth aspect or the possible implementations of the sixteenth aspect.

According to a twenty-first aspect, an embodiment of this application provides a communication apparatus, including a processor. The processor is coupled to a memory, and the memory is configured to store a program or instructions. When the program or the instructions are executed by the processor, the apparatus is enabled to implement the method according to any one of the seventeenth aspect or the possible implementations of the seventeenth aspect.

According to a twenty-second aspect, an embodiment of this application provides a communication apparatus. The apparatus is configured to implement the method according to any one of the sixteenth aspect or the possible implementations of the sixteenth aspect.

According to a twenty-third aspect, an embodiment of this application provides a communication apparatus. The apparatus is configured to implement the method according to any one of the seventeenth aspect or the possible implementations of the seventeenth aspect.

According to a twenty-fourth aspect, an embodiment of this application provides a computer-readable medium, where the computer-readable medium stores a computer program or instructions. When the computer program or the instructions are executed, a computer is enabled to perform the method according to any one of the sixteenth aspect or the possible implementations of the sixteenth aspect.

According to a twenty-fifth aspect, an embodiment of this application provides a computer-readable medium, where the computer-readable medium stores a computer program or instructions. When the computer program or the instructions are executed, a computer is enabled to perform the method according to any one of the seventeenth aspect or the possible implementations of the seventeenth aspect.

According to a twenty-sixth aspect, an embodiment of this application provides a computer program product, where the computer program product includes computer program code. When the computer program code is run on a computer, the computer is enabled to perform the method according to any one of the sixteenth aspect or the possible implementations of the sixteenth aspect.

According to a twenty-seventh aspect, an embodiment of this application provides a computer program product, where the computer program product includes computer program code. When the computer program code is run on a computer, the computer is enabled to perform the method according to any one of the seventeenth aspect or the possible implementations of the seventeenth aspect.

According to a twenty-eighth aspect, an embodiment of this application provides a chip, including a processor. The processor is coupled to a memory, and the memory is configured to store a program or instructions. When the program or the instructions are executed by the processor, the chip is enabled to implement the method according to any one of the sixteenth aspect or the possible implementations of the sixteenth aspect.

According to a twenty-ninth aspect, an embodiment of this application provides a chip, including a processor. The processor is coupled to a memory, and the memory is configured to store a program or instructions. When the program or the instructions are executed by the processor, the chip is enabled to implement the method according to any one of the seventeenth aspect or the possible implementations of the seventeenth aspect.

According to a thirtieth aspect, an embodiment of this application provides a communication system. The system includes the apparatus according to the eighteenth aspect and/or the apparatus according to the nineteenth aspect, the system includes the apparatus according to the twentieth aspect and/or the apparatus according to the twenty-first aspect, or the system includes the apparatus according to the twenty-second aspect and/or the apparatus according to the twenty-third aspect.

It may be understood that any communication apparatus, chip, computer-readable medium, computer program product, communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

DESCRIPTION OF EMBODIMENTS

The following describes implementations of embodiments of this application in detail with reference to the accompanying drawings.

A method provided in embodiments of this application may be applied to various communication systems. For example, the communication system may be a 5th generation (5G) communication system, a new radio (NR) system, a 3rd generation partnership project (3GPP)-related communication system, a future evolved communication system, or the like. This is not limited. The following uses only a communication system 10 shown in FIG. 1 as an example to describe the method provided in embodiments of this application.

Figure 1:
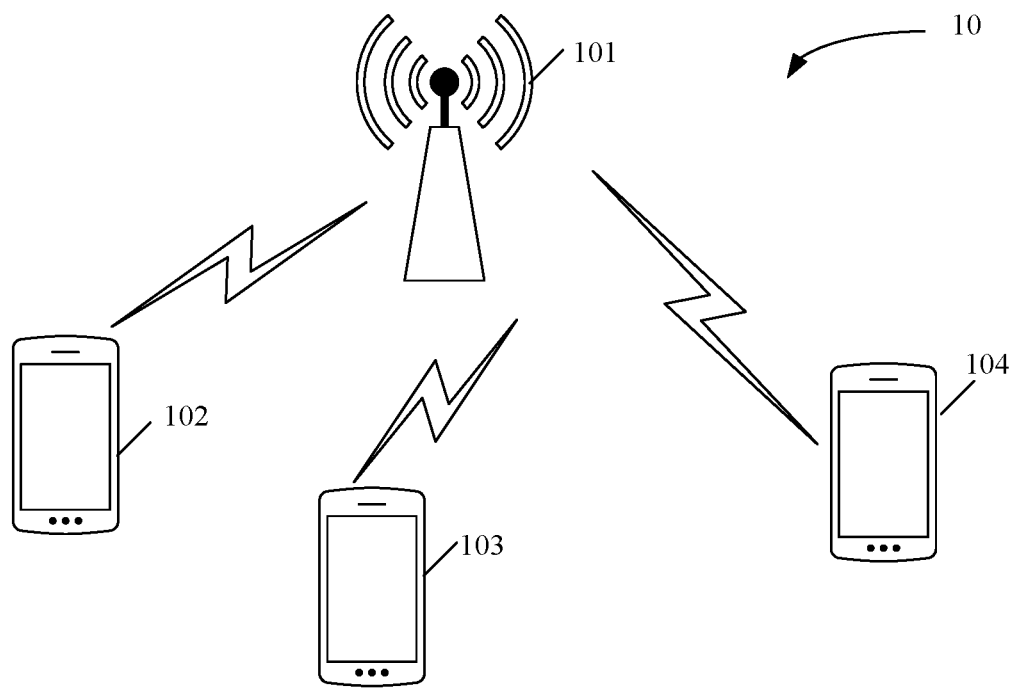
FIG. 1 is a schematic diagram of an architecture of a communication system according to an embodiment of this application.

FIG. 1 is a schematic diagram of an architecture of the communication system 10 according to an embodiment of this application. In FIG. 1, the communication system 10 may include one or more network devices 101 (where only one network device is shown) and a terminal apparatus 102 to a terminal apparatus 104 that can communicate with the network device 101. FIG. 1 is merely a schematic diagram, and does not constitute a limitation on an applicable scenario of technical solutions provided in this application.

In FIG. 1, the network device may provide a wireless access service for the terminal device. Specifically, each network device corresponds to one service coverage area. A terminal apparatus that enters the area may communicate with the network device through a Uu interface, to receive a wireless access service provided by the network device. The terminal apparatus and the network device may communicate with each other through a Uu interface link. Uu interface links may be classified into an uplink (UL) and a downlink (DL) based on directions of data transmission on the Uu interface links. Uplink data sent from the terminal apparatus to the network device may be transmitted on the UL, and downlink data transmitted from the network device to the terminal apparatus may be transmitted on the DL. For example, in FIG. 1, the terminal apparatus 103 is located in a coverage area of the network device 101. The network device 101 may send downlink data to the terminal apparatus 103 through a DL, and the terminal apparatus 103 may send uplink data to the network device 101 through a UL.

The network device in FIG. 1, for example, the network device 101, may be any device having a wireless transceiver function. The network device includes but is not limited to a base station (a gNodeB or a gNB) or a transmission reception point (TRP) in NR, a base station in evolved 3GPP, and the like. A base station may be a macro base station, a micro base station, a picocell base station, a small cell, a relay station, a balloon station, or the like. A plurality of base stations may support the foregoing networks using a same technology, or may support the foregoing networks using different technologies. The base station may include one or more co-site or non-co-site TRPs. The network device may alternatively be a radio controller, a central unit (CU), and/or a distributed unit (DU) in a cloud radio access network (CRAN) scenario. The network device may alternatively be a server, a wearable device, a machine communication device, a vehicle-mounted device, or the like. That the network device is a base station is used as an example for description below. The plurality of network devices may be base stations of a same type, or may be base stations of different types. The base station may communicate with the terminal apparatus, or may communicate with the terminal apparatus through a relay station.

The terminal apparatus in FIG. 1, for example, the terminal apparatus 102, the terminal apparatus 103, or the terminal apparatus 104, is a device having a wireless transceiver function, and may be deployed on land, where the deployment includes indoor, outdoor, handheld, wearable, or vehicle-mounted deployment; may be deployed on water (for example, on a ship); or may be deployed in air (for example, on an aircraft, a balloon, and a satellite). The terminal apparatus may be a mobile phone (mobile phone), a tablet computer (Pad), a computer having a wireless transceiver function, a virtual reality (VR) terminal, an augmented reality (AR) terminal, a terminal in industrial control (industrial control), a vehicle-mounted terminal, a terminal in self-driving (self-driving), a terminal in assisted driving, a terminal in telemedicine (remote medical), a terminal in a smart grid (smart grid), a terminal in transportation safety (transportation safety), a terminal in a smart city (smart city), a terminal in a smart home (smart home), or the like. An application scenario is not limited in embodiments of this application. The terminal apparatus may also be sometimes referred to as a terminal device, user equipment (UE), an access terminal, a vehicle-mounted terminal, an industrial control terminal, a UE unit, a UE station, a mobile station, a remote station, a remote terminal, a mobile device, a UE terminal device, a wireless communication device, a machine terminal, a UE agent, a UE apparatus, or the like The terminal apparatus may be fixed or movable.

By way of example rather than limitation, the terminal apparatus in this application may be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to operate with other devices such as smartphones, such as various smart bands or smart jewelry for monitoring physical signs.

In this application, the terminal apparatus may be a terminal in an internet of things (IoT) system. An IoT is an important component of future information technology development. A main technical feature of the IoT is connecting an object to a network by using a communication technology, to implement an intelligent network of human-machine interconnection and thing-thing interconnection. The terminal apparatus in this application may be a terminal in machine type communication (MTC). The terminal apparatus in this application may be a vehicle-mounted module, a vehicle-mounted component, a vehicle-mounted chip, or a vehicle-mounted unit that is built in a vehicle as one or more components or units. The vehicle may implement a method in this application by using the vehicle-mounted module, the vehicle-mounted component, the vehicle-mounted chip, or the vehicle-mounted unit that is built in the vehicle.

In the communication system 10 shown in FIG. 1, the network device 101 sends an SSB in a broadcast manner. The SSB includes a primary synchronization signal (PSS), a secondary synchronization signal (SSS), and a physical broadcast channel (PBCH). The PBCH includes a master information block (MIB) and an additional PBCH payload (additional PBCH payload, or additional timing related PBCH payload). For descriptions of the PSS and the SSS, refer to explanations in a conventional technology. Details are not described.

The MIB includes at least one of the following information: a system frame number (SFN), a common subcarrier spacing (subCarrierSpacingCommon), an SSB subcarrier offset (ssb-SubcarrierOffset), a symbol position (dmrs-TypeA-Position) of a demodulation reference signal (DMRS) in one slot, configuration information of a control resource set (control resource set, CORESET) #0 and a type 0 common search space (pdcch-ConfigSIB1), a cellBarred (cellBarred) field, an intraFreqReselection (intraFreqReselection) field, or a spare (spare) field. For descriptions of the SFN, the common subcarrier spacing, the SSB subcarrier offset, the symbol position of the DMRS in one slot, the configuration information of the CORESET #0 and the type 0 common search space, the cellBarred field, the intraFreqReselectionn field, and the spare field, refer to explanations and descriptions in a conventional technology. Details are not described.

The additional PBCH payload includes information other than the MIB in the PBCH. For example, a frequency range in which the communication system 10 operates is frequency range 1 (FR1), to be specific, an operating frequency of the communication system 10 is less than 6 GHz. The additional PBCH payload includes at least one of the following information: an SFN supplementary field, a half-frame indicator field, an indicator field indicating a most significant bit (MSB) bit of an SSB subcarrier offset, or a reserved field. For descriptions of the SFN supplementary field, the half-frame indicator field, the indicator field indicating the MSB bit of the SSB subcarrier offset, and the reserved field, refer to explanations and descriptions in a conventional technology. Details are not described.

For example, the frequency range in which the communication system 10 operates is frequency range 2 (FR2), to be specific, an operating frequency of the communication system 10 is greater than or equal to 6 GHz. The additional PBCH payload includes at least one of the following information: an SFN supplementary field, a half-frame indicator field, or an indicator field indicating three MSB bits of an SSB index. For descriptions of the SFN supplementary field, the half-frame indicator field, and the indicator field indicating the three MSB bits of the SSB index, refer to explanations and descriptions in a conventional technology. Details are not described.

If the terminal apparatus, for example, the terminal apparatus 102, the terminal apparatus 103, or the terminal apparatus 104, expects to access the network device 101, the terminal apparatus receives the SSB, and receives downlink control information (DCI) based on the PBCH in the SSB, where the DCI is for scheduling a system information block type 1 (SIB1), and the SIB1 includes a SIB1 information block. After receiving the DCI, the terminal apparatus may receive the SIB1 based on the DCI, and obtain random access channel (RACH) configuration information in the SIB1 information block. The RACH configuration information includes a random access related parameter, for example, a time domain resource of a random access preamble (preamble) and/or a frequency domain resource of the preamble. Subsequently, the terminal apparatus may initiate a random access procedure (random access procedure) to access the network device 101.

For example, the terminal apparatus may access the network device 101 in the following 4-step (4-step) RACH manner or 2-step (2-step) RACH manner. An example in which the terminal apparatus 102 initiates a random access procedure is used below for description.

(1) 4-step RACH manner. A process in which the terminal apparatus 102 accesses the network device 101 in the 4-step RACH manner may include the following step 1 to step 4.

Step 1: The terminal apparatus 102 sends a random access request to the network device 101.

Sending the random access request is represented as sending a random access preamble (preamble). The random access request is also referred to as a first message or a message 1 (Msg1) in the random access procedure.

Step 2: After detecting the random access request sent by the terminal apparatus 102, the network device 101 sends a random access response (RAR) to the terminal apparatus 102.

The random access response is also referred to as a second message or a message 2 (Msg2) in the random access procedure.

Step 3: The terminal apparatus 102 receives the RAR from the network device 101, and sends uplink data to the network device 101.

The uplink data is also referred to as a third message or a message 3 (Msg3) in the random access procedure. In one case, the Msg3 includes control plane data (control plane data, CP data), for example, radio resource control (RRC) information. For example, the RRC information includes an RRC connection establishment request (RRC connection establishment request), an RRC connection resume request (RRC connection resume request), or the like. In another case, the Msg3 includes control plane data and user plane data.

Step 4: The network device 101 receives the uplink data from the terminal apparatus 102, and sends a contention resolution message to the terminal apparatus 102.

Correspondingly, the terminal apparatus 102 receives the contention resolution message from the network device 101.

The contention resolution message is also referred to as a fourth message or a message 4 (Msg4) in the random access procedure.

(2) 2-step RACH manner. A process in which the terminal apparatus 102 accesses the network device 101 in the 2-step RACH manner may include the following step a and step b.

Step a: The terminal apparatus 102 sends a message A (MsgA) to the network device 101.

The MsgA includes a random access preamble (preamble) and a physical uplink shared channel (PUSCH). The MsgA in step a is equivalent to the Msg1 in step 1 and the Msg3 in step 3. Alternatively, it may be understood as "sending the Msg1 and the Msg3 together".

Step b: The network device 101 receives the MsgA from the terminal apparatus 102, and sends a message B (MsgB) to the terminal apparatus 102.

Correspondingly, the terminal apparatus 102 receives the message B (MsgB) from the network device 101.

The MsgB includes at least one of the following: a response message for the preamble and a response message for uplink data. In other words, the MsgB includes at least one of the following: a RAR and a contention resolution message. It may be understood that if the MsgB does not include the contention resolution message, the 2-step RACH manner is changed to the 4-step RACH manner.

It may be understood that the terminal apparatuses in FIG. 1 may be classified into different types of terminal apparatuses according to a requirement. For example, based on a size of a bandwidth or a number of receive antennas, the terminal apparatuses may be classified into a REDCAP terminal and a common terminal. A bandwidth of the REDCAP terminal is less than that of the common terminal, and/or a number of receive antennas of the REDCAP terminal is less than that of the common terminal. For example, the bandwidth of the common terminal may reach 100 MHz, and the bandwidth of the REDCAP terminal is less than 100 MHz. For another example, the number of receive antennas of the common terminal may reach 4, and the number of receive antennas of the REDCAP terminal is only 2 or 1. Therefore, the REDCAP terminal may be applied to a scenario in which a bandwidth requirement is not high. For example, the REDCAP terminal may be an industrial sensor, a video surveillance device, a wearable device, or the like.

Further, REDCAP terminals may be classified based on a size of a bandwidth or a number of receive antennas.

For example, the frequency range in which the communication system 10 operates is FR1. The REDCAP terminal may include a first-type REDCAP terminal and a second-type REDCAP terminal. A bandwidth of the second-type REDCAP terminal is less than that of the first-type REDCAP terminal. For example, the bandwidth of the first-type REDCAP terminal is greater than 10 MHz and less than or equal to 20 MHz, and the bandwidth of the second-type REDCAP terminal is greater than 0 MHz and less than or equal to 10 MHz. Alternatively, a number of receive antennas of the second-type REDCAP terminal is less than that of the first-type REDCAP terminal. For example, the number of receive antennas of the first-type REDCAP terminal is 2, and the number of receive antennas of the second-type REDCAP terminal is 1. Alternatively, a bandwidth of the second-type REDCAP terminal is less than that of the first-type REDCAP terminal, and a number of receive antennas of the second-type REDCAP terminal is less than that of the first-type REDCAP terminal. For example, the bandwidth of the first-type REDCAP terminal is greater than 10 MHz and less than or equal to 20 MHz, and the number of receive antennas of the first-type REDCAP terminal is 2; the bandwidth of the second-type REDCAP terminal is greater than 0 MHz and less than or equal to 10 MHz, and the number of receive antennas of the second-type REDCAP terminal is 1.

For example, the frequency range in which the communication system 10 operates is FR2, and the REDCAP terminal may include a third-type REDCAP terminal. A bandwidth of the third-type REDCAP terminal is greater than or equal to 50 MHz.

It may be understood that, in embodiments of this application, the first-type REDCAP terminal, the second-type REDCAP terminal, and the third-type REDCAP terminal are merely examples of names of different types of terminal apparatuses. In actual application, the first-type REDCAP terminal, the second-type REDCAP terminal, and the third-type REDCAP terminal may be alternatively named in another manner. This is not limited.

It may be understood that, before initiating the random access procedure, the terminal apparatus further needs to determine, based on an indication of the network device, whether the terminal apparatus is allowed to access the network device. For the common terminal, the network device may indicate, by using an cellBarred field (that is, a cellBarred field) in the MIB, whether the common terminal is allowed to access the network device. However, for the first-type REDCAP terminal, the second-type REDCAP terminal, and the third-type REDCAP terminal, there is no method for enabling the network device to control access of the first-type REDCAP terminal, the second-type REDCAP terminal, and the third-type REDCAP terminal.

To resolve the foregoing problem, embodiments of this application provide a network device accessing method, to control a number of REDCAP terminals that access a network device. The method includes: A terminal apparatus receives, from a network device, first information indicating whether a REDCAP terminal is allowed to access the network device, and determines, based on the first information, whether to access the network device. Specifically, refer to the following descriptions in FIG. 3 to FIG. 8.

The communication system 10 shown in FIG. 1 is merely used as an example, but is not intended to limit the technical solutions in this application. A person skilled in the art should understand that in a specific implementation process, the communication system 10 may further include another device, and a number of network devices and a number of terminals may alternatively be determined according to a specific requirement. This is not limited.

Optionally, each network element in FIG. 1 in embodiments of this application, for example, the network device 101, the terminal apparatus 102, the terminal apparatus 103, or the terminal apparatus 104, may be a functional module in an apparatus. It may be understood that the functional module may be an element in a hardware device, for example, a communication chip or a communication component in a terminal apparatus or a network device, or may be a software functional module running on hardware or a virtualized function instantiated on a platform (for example, a cloud platform).

Figure 2:
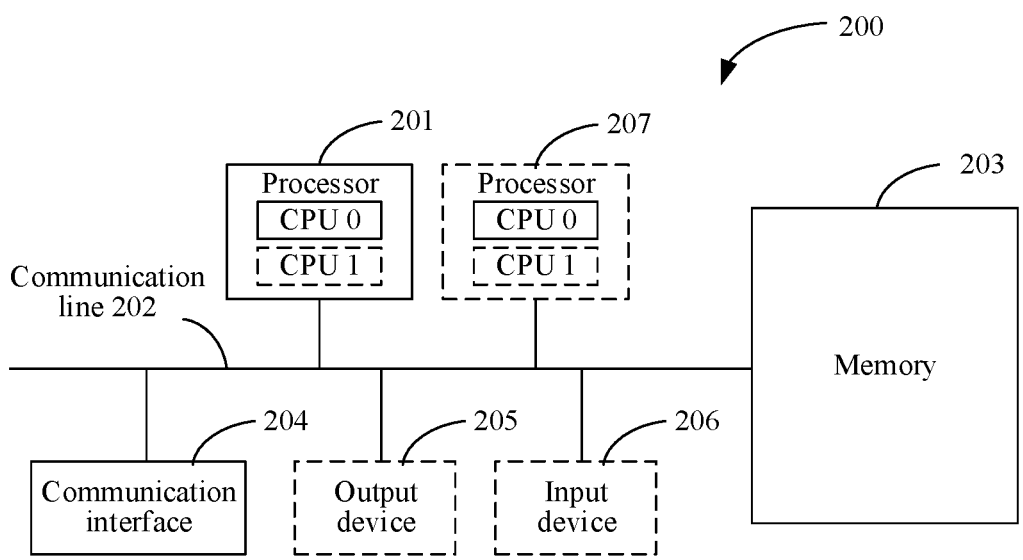
FIG. 2 is a schematic diagram of a hardware structure of a communication apparatus according to an embodiment of this application.

For example, each network element in FIG. 1 may be implemented by a communication apparatus 200 in FIG. 2. FIG. 2 is a schematic diagram of a hardware structure of a communication apparatus that may be used in an embodiment of this application. The communication apparatus 200 includes at least one processor 201, a communication line 202, a memory 203, and at least one communication interface 204.

The processor 201 may be a general-purpose central processing unit (central processing unit, CPU), a microprocessor, an application-specific integrated circuit (application-specific integrated circuit, ASIC), or one or more integrated circuits configured to control execution of programs in the solutions in this application.

The communication line 202 may include a path, for example, a bus, for transmitting information between the foregoing components.

The communication interface 204 is configured to communicate with another device or a communication network by using any apparatus such as a transceiver, and is, for example, an Ethernet interface, a radio access network (RAN) interface, or a wireless local area network (WLAN) interface.

The memory 203 may be a read-only memory (read-only memory, ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that is accessible to a computer, but is not limited thereto. The memory may exist independently, and is connected to the processor through the communication line 202. The memory may alternatively be integrated with the processor. The memory provided in embodiments of this application may be usually non-volatile. The memory 203 is configured to store computer-executable instructions for executing the solutions in this application, and execution is controlled by the processor 201. The processor 201 is configured to execute the computer-executable instructions stored in the memory 203, to implement a method provided in embodiments of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communication apparatus 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the communication apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector (projector). The input device 206 communicates with the processor 201, and may receive an input from a user in a plurality of manners. For example, the input device 206 may be a mouse, a keyboard, a touchscreen device, or a sensor device.

The foregoing communication apparatus 200 may be a general-purpose device or a special-purpose device. During specific implementation, the communication apparatus 200 may be a desktop computer, a portable computer, a network server, a personal digital assistant (personal digital assistant, PDA), a mobile phone, a tablet computer, a wireless terminal device, an embedded device, or a device having a structure similar to that in FIG. 2. A type of the communication apparatus 200 is not limited in this embodiment of this application.

The following describes in detail a network device accessing method according to embodiments of this application with reference to FIG. 1 and FIG. 2.

It should be noted that names of messages between network elements, names of parameters in the messages, or the like in the following embodiments of this application are merely examples, and there may be other names in a specific implementation. This is not specifically limited in embodiments of this application.

It should be noted that, in descriptions of this application, words such as "first" or "second" are merely used for distinction and description, and shall not be understood as an indication or implication of relative importance or an indication or implication of an order. Different sequence numbers of information such as "first information" and "second information" in this application are merely used for contextual convenience, and different sequence numbers do not have specific technical meanings. For example, first information or second information may be understood as one or any one of a series of pieces of information.

It should be noted that, in the following embodiments of this application, the word "example" or "for example" is used to represent giving an example, an illustration, or a description. Any embodiment or design scheme described as an "example" or with "for example" in the following embodiments of this application should not be explained as being more preferred or having more advantages than another embodiment or design scheme. Exactly, use of the word such as "example" or "for example" is intended to present a relative concept in a specific manner.

It may be understood that a same step or a step or a message having a same function in embodiments of this application may be mutually referenced in different embodiments.

It may be understood that, in embodiments of this application, a network device and/or a terminal apparatus may perform some or all of steps in embodiments of this application. The steps are merely examples. In embodiments of this application, other steps or variations of various steps may alternatively be performed. In addition, the steps may be performed in a sequence different from a sequence presented in embodiments of this application, and not all the steps in embodiments of this application need to be performed.

In embodiments of this application, a specific structure of an execution body of the network device accessing method is not particularly limited in embodiments of this application, provided that a program that records code of the network device accessing method in embodiments of this application may be run to perform communication according to the network device accessing method in embodiments of this application. For example, the execution body of the network device accessing method provided in embodiments of this application may be a network device, or a component, for example, a chip, used in the network device. This is not limited in this application. Alternatively, the network device accessing method provided in embodiments of this application may be performed by a terminal apparatus, or a component, for example, a chip, used in the terminal apparatus. This is not limited in this application. The following embodiments are described by using an example in which network device accessing methods are separately executed by a network device and a terminal apparatus.

Figure 3:
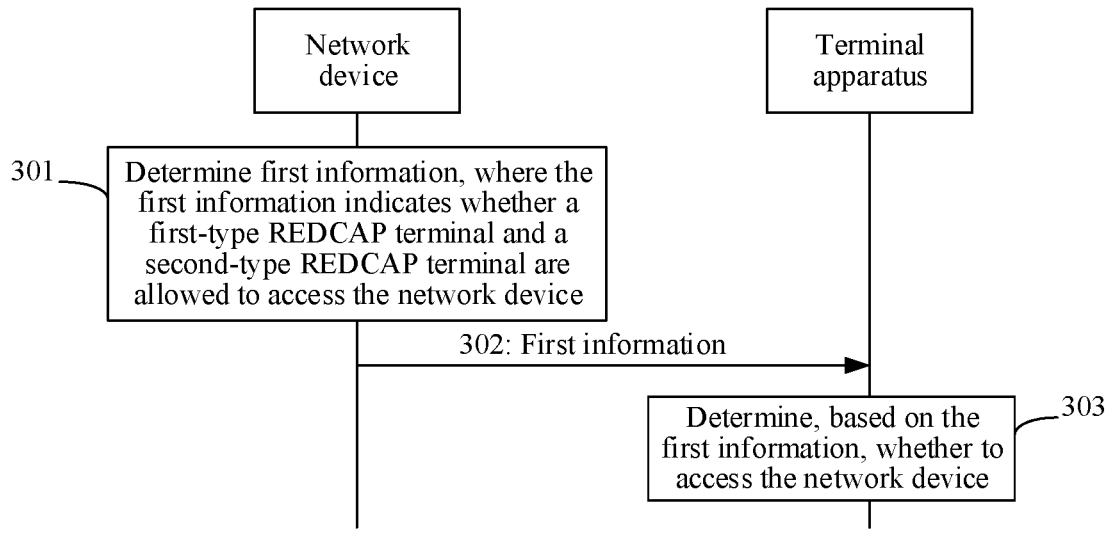
FIG. 3 is a first schematic flowchart of a network device accessing method according to an embodiment of this application.

FIG. 3 shows a network device accessing method according to an embodiment of this application. The network device accessing method includes step 301 to step 303.

Step 301: A network device determines first information.

The network device may be the network device 101 in FIG. 1.

The first information may indicate whether a REDCAP terminal is allowed to access the network device. The REDCAP terminal includes a first-type REDCAP terminal and a second-type REDCAP terminal. The first-type REDCAP terminal and the second-type REDCAP terminal operate in a same frequency range (have the same frequency range). For example, an operating frequency range of the first-type REDCAP terminal and the second-type REDCAP terminal is less than 6 GHz, and the range is denoted as FR1. When the operating frequency range is FR1, for descriptions of the first-type REDCAP terminal and the second-type REDCAP terminal, refer to the descriptions in FIG. 1.

In a possible implementation, the first information includes first indication information and second indication information. The first indication information and the second indication information may respectively indicate whether the first-type REDCAP terminal is allowed to access the network device and whether the second-type REDCAP terminal is allowed to access the network. Alternatively, the first indication information and the second indication information may jointly indicate whether the first-type REDCAP terminal is allowed to access the network device and whether the second-type REDCAP terminal is allowed to access the network. For example, the first indication information and the second indication information may indicate, in the following manner, whether the first-type REDCAP terminal is allowed to access the network device and whether the second-type REDCAP terminal is allowed to access the network.

Manner 1: The first indication information indicates whether the first-type REDCAP terminal is allowed to access the network device, and the second indication information indicates whether the second-type REDCAP terminal is allowed to access the network device.

It may be understood that in this case, the network device may separately indicate, by using the first indication information and the second indication information respectively, whether the first-type REDCAP terminal is allowed to access the network device and whether the second-type REDCAP terminal is allowed to access the network. The indication is clear and convenient.

For the manner 1, there may be the following six cases:

Case 1.1: The first information is included in an SSB. For descriptions of the SSB, refer to the descriptions in FIG. 1.

In a possible implementation, the first indication information includes a spare field in a MIB, and the second indication information includes a reserved field in an additional PBCH payload.

For example, the first indication information indicates, by using one bit in the spare field in the MIB, whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around.

For example, the second indication information indicates, by using one bit in the reserved field in the additional PBCH payload, whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around. It may be understood that the bit may be a high-order bit in the reserved field, or may be a low-order bit in the reserved field. This is not limited.

In another possible implementation, the first indication information includes an cellBarred field in a MIB, and the second indication information includes a spare field in the MIB or includes a reserved field in an additional PBCH payload.

It may be understood that, a bandwidth of the first-type REDCAP terminal is similar to a bandwidth of a common terminal, the two terminals may share a CORESET #0, and compatibility is good. In addition, existence of the first-type REDCAP terminal has little impact on network performance. Therefore, the first-type REDCAP terminal may reuse a field of the common terminal for indicating whether access to the network device is allowed. To be specific, in addition to indicating whether the common terminal is allowed to access the network device, the cellBarred field further indicates whether the first-type REDCAP terminal is allowed to access the network device. However, a bandwidth of the second-type REDCAP terminal is much smaller than the bandwidth of the common terminal, the second-type REDCAP terminal may not share a CORESET #0 with the common terminal, and compatibility is poor. A number of second-type REDCAP terminals has great impact on network performance. Therefore, a field different from the cellBarred field needs to be used for indicating whether the second-type REDCAP terminal is allowed to access the network device. In addition, the first-type REDCAP terminal reuses the field of the common terminal for indicating whether access to the network device is allowed, so that a number of bits may be saved, and the saved bits are used for other purposes. This facilitates backward compatibility extension of a communication system.

For example, if a value of the cellBarred field is 1, the first indication information indicates that the common terminal is allowed to access the network device, and indicates that the first-type REDCAP terminal is allowed to access the network device; or if a value of the cellBarred field is 0, the first indication information indicates that the common terminal is not allowed to access the network device, and indicates that the first-type REDCAP terminal is not allowed to access the network device. This is also true the other way around.

For example, the second indication information indicates, by using one bit in the spare field in the MIB, whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around. Alternatively, the second indication information indicates, by using one bit in the reserved field in the additional PBCH payload, whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around. It may be understood that the bit in the reserved field may be a high-order bit in the reserved field, or may be a low-order bit in the reserved field. This is not limited.

Case 1.2: The first information is included in DCI. The DCI is used for scheduling a SIB1.

The SIB1 includes a SIB1 information block. For descriptions of the SIB1 information block, refer to explanations in a conventional technology.

In a possible implementation, the first indication information is included in a reserved field in the DCI, and the second indication information is included in the reserved field in the DCI.

That the first indication information and the second indication information are included in the reserved field in the DCI may be understood as that the first indication information includes a first part of the reserved field in the DCI, and the second indication information includes a second part of the reserved field in the DCI. For example, when the reserved field in the DCI is five bits, the first indication information includes one of the five bits, to indicate whether the first-type REDCAP terminal is allowed to access the network device, and the second indication information includes another one of the five bits, to indicate whether the second-type REDCAP terminal is allowed to access the network device. Alternatively, a part of the reserved field in the DCI may jointly indicate whether the first-type REDCAP and the second-type REDCAP are allowed to access the network device.

For example, the first indication information includes one bit in the reserved field in the DCI, to indicate whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around. The second indication information includes another one bit in the reserved field in the DCI, to indicate whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around.

Case 1.3: The first information is included in a SIB1 information block.

In a possible implementation, the first indication information is included in the SIB1 information block, and the second indication information is included in the SIB1 information block.

That the first indication information and the second indication information are included in the SIB1 information block may be understood as that the first indication information includes a first part of the SIB1 information block, and the second indication information includes a second part of the SIB1 information block. For example, when the SIB1 information block is 32 bits, the first indication information includes one of the 32 bits, to indicate whether the first-type REDCAP terminal is allowed to access the network device, and the second indication information includes another one of the 32 bits, to indicate whether the second-type REDCAP terminal is allowed to access the network device. Alternatively, a part of the SIB1 information block may jointly indicate whether the first-type REDCAP and the second-type REDCAP are allowed to access the network device.

For example, the first indication information includes one bit in the SIB1 information block, to indicate whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around. The second indication information includes another one bit in the SIB1 information block, to indicate whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around.

It may be understood that one bit, in the SIB1 information block, indicating whether the first-type REDCAP terminal is allowed to access the network device may be included in a newly added information element (IE) in the SIB1 information block, or may be included in an original IE in the SIB1 information block. One bit, in the SIB1 information block, indicating whether the second-type REDCAP terminal is allowed to access the network device may be included in a newly added IE in the SIB1 information block, or may be included in an original IE in the SIB1 information block.

Case 1.4: The first information is included in DCI and a SIB1.

In a possible implementation, the first indication information is included in a reserved field in the DCI, and the second indication information is included in a SIB1 information block.

For example, the first indication information includes one bit in the reserved field in the DCI, to indicate whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around. The second indication information includes one bit in the SIB1 information block, to indicate whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around.

In another possible implementation, the first indication information is included in a SIB1 information block, and the second indication information is included in a reserved field in the DCI.

For example, the first indication information includes one bit in the SIB1 information block, to indicate whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around. The second indication information includes one bit in the reserved field in the DCI, to indicate whether the second-type REDCAP terminal is allowed to access the network device. For example, if a value of the bit is 1, the second indication information indicates that the second-type REDCAP terminal is allowed to access the network device; or if a value of the bit is 0, the second indication information indicates that the second-type REDCAP terminal is not allowed to access the network device. This is also true the other way around.

Case 1.5: The first information is included in an SSB and DCI.

In a possible implementation, the first indication information includes a spare field in a MIB, or a reserved field in an additional PBCH payload, or an cellBarred field in the MIB, and the second indication information is included in a reserved field in the DCI.

For the first indication information that includes the spare field in the MIB, the reserved field in the additional PBCH payload, or the cellBarred field in the MIB, refer to the foregoing descriptions in case 1.1. For a case in which the second indication information is included in the reserved field in the DCI, refer to the descriptions in the foregoing case 1.2. For example, the first indication information includes the spare field in the MIB, and the second indication information is included in the reserved field in the DCI. Certainly, another configuration combination is also applicable.

In another possible implementation, the first indication information is included in a reserved field in the DCI, and the second indication information includes a spare field in a MIB, a reserved field in an additional PBCH payload, or an cellBarred field in the MIB.

For a case in which the first indication information is included in the reserved field in the DCI, refer to the descriptions in the foregoing case 1.2. For the second indication information that includes the spare field in the MIB, the reserved field in the additional PBCH payload, or the cellBarred field in the MIB, refer to the foregoing descriptions in case 1.1. For example, the first indication information is included in the reserved field in the DCI, and the second indication information includes the spare field in the MIB. Certainly, another configuration combination is also applicable.

Case 1.6: The first information is included in an SSB and a SIB1.

In a possible implementation, the first indication information includes a spare field in a MIB, or a reserved field in an additional PBCH payload, or an cellBarred field in the MIB, and the second indication information is included in a SIB1 information block.

For the first indication information that includes the spare field in the MIB, the reserved field in the additional PBCH payload, or the cellBarred field in the MIB, refer to the foregoing descriptions in case 1.1. For a case in which the second indication information is in the SIB1 information block, refer to the foregoing descriptions in case 1.3. For example, the first indication information includes the spare field in the MIB, and the second indication information is included in the SIB1 information block. Certainly, another configuration combination is also applicable.

In another possible implementation, the first indication information is included in a SIB1 information block, and the second indication information includes a spare field in a MIB, a reserved field in an additional PBCH payload, or an cellBarred field in the MIB.

For a case in which the first indication information is in the SIB1 information block, refer to the foregoing descriptions in case 1.3. For the second indication information that includes the spare field in the MIB, the reserved field in the additional PBCH payload, or the cellBarred field in the MIB, refer to the foregoing descriptions in case 1.1. For example, the first indication information is included in the SIB1 information block, and the second indication information includes the spare field in the MIB. Certainly, another configuration combination is also applicable.

Manner 2: The first indication information indicates whether the first-type REDCAP terminal is allowed to access the network device, and the first indication information and the second indication information indicate whether the second-type REDCAP terminal is allowed to access the network device. In other words, the first indication information indicates whether the REDCAP terminal (including the first-type REDCAP terminal and the second-type REDCAP terminal) is allowed to access the network device. The second indication information indicates whether the second-type REDCAP terminal is allowed to access the network device.

It may be understood that if the first indication information indicates that the REDCAP terminal is not allowed to access the network device, neither the first-type REDCAP terminal nor the second-type REDCAP terminal can access the network device. If the first indication information indicates that the REDCAP terminal is allowed to access the network device, the first-type REDCAP terminal may access the network device. In this case, if the second indication information indicates that the second-type REDCAP terminal is allowed to access the network device, the second-type REDCAP terminal may access the network device; or if the second indication information indicates that the second-type REDCAP terminal is not allowed to access the network device, the second-type REDCAP terminal cannot access the network device.

It may be understood that a bandwidth of the first-type REDCAP terminal is similar to a bandwidth of a common terminal, and the two terminals may share a CORESET #0. Therefore, the first-type REDCAP terminal has small impact on transmission performance of a network provided by the network device. Therefore, compared with the second-type REDCAP terminal, the first-type REDCAP terminal has a higher priority of accessing the network device.

For the manner 2, there may be the following six cases:

Case 2.1: The first information is included in an SSB.

In a possible implementation, the first indication information includes a spare field in a MIB, and the second indication information includes a reserved field in an additional PBCH payload.

For example, the first indication information indicates, by using one bit in the spare field in the MIB, whether the first-type REDCAP terminal is allowed to access the network device. For example, if a value of the bit is 1, the first indication information indicates that the first-type REDCAP terminal is allowed to access the network device; or if a value of the bit is 0, the first indication information indicates that the first-type REDCAP terminal is not allowed to access the network device. This is also true the other way around.

For example, when the first indication information indicates, by using one bit in the spare field in the MIB, that the first-type REDCAP terminal is allowed to access the network device, the second indication information indicates, by using one bit in the reserved field in the additional PBCH payload, whether the second-type REDCAP terminal is allowed to access the network device. For example, when the first indication information indicates, by using one bit in the spare field in the MIB, that the first-type REDCAP terminal is allowed to access the network device, if a value of the bit in the reserved field is 1, the second indication information indicates that the second-type REDCAP terminal is allowed to access the network device; or if a value of the bit in the reserved field is 0, the second indication information indicates that the second-type REDCAP terminal is not allowed to access the network device. This is also true the other way around. It may be understood that the bit in the reserved field may be a high-order bit in the reserved field, or may be a low-order bit in the reserved field. This is not limited.

It may be understood that, in the manner 2, when the first indication information indicates that the first-type REDCAP terminal is not allowed to access the network, the second-type REDCAP terminal is not allowed to access the network device. Therefore, the bit in the reserved field does not need to indicate whether the second-type REDCAP terminal is allowed to access the network device, but may be used for another purpose. For example, the bit in the reserved field may indicate whether the REDCAP terminal can search for an SSB of another cell on a same frequency. In this way, the first information may indicate more information, thereby improving flexibility of indicating information by the first information.

Case 2.2: The first information is included in DCI.

For descriptions of case 2.2, refer to the descriptions in case 1.2.

Case 2.3: The first information is included in a SIB1 information block.

For descriptions of case 2.3, refer to the descriptions in case 1.3.

Case 2.4: The first information is included in DCI and a SIB1.

For descriptions of case 2.4, refer to the descriptions in case 1.4.

Case 2.5: The first information is included in an SSB and DCI.

For descriptions of case 2.5, refer to the descriptions in case 1.5.

Case 2.6: The first information is included in an SSB and a SIB1.

For descriptions of case 2.6, refer to the descriptions in case 1.6.

In a possible implementation, the network device determines the first information based on transmission performance of a network managed by the network device. For example, if the transmission performance of the network is greater than or equal to a threshold, the network device does not limit a number of REDCAP terminals; or if the transmission performance of the network is less than the threshold, the network device limits the number of REDCAP terminals. For example, the transmission performance of the network may be related to a total number of terminal apparatuses currently served by the network device, transmission spectral efficiency of the network, or the like. For example, compared with a case in which the total number of terminal apparatuses currently served by the network device is small, when the total number of terminal apparatuses currently served by the network device is large, transmission performance of the network is low. For another example, compared with a case in which the transmission spectral efficiency of the network is low, when the transmission spectral efficiency of the network is high, transmission performance of the network is high.

Step 302: The network device sends the first information to a terminal device.

The terminal apparatus is any one or more terminal apparatuses in FIG. 1. For example, the terminal apparatus is the terminal apparatus 102 in FIG. 1, or the terminal apparatus is the terminal apparatus 102 and the terminal apparatus 103 in FIG. 1.

Correspondingly, the terminal apparatus receives the first information from the network device.

Step 303: The terminal apparatus determines, based on the first information, whether to access the network device.

The terminal apparatus is the first-type REDCAP terminal, the second-type REDCAP terminal, or a common terminal.

In a possible implementation, if the terminal apparatus is a common terminal, the terminal apparatus determines, based on an cellBarred field (cellBarred field), whether to access the network device. For example, if a value of the cellBarred field is 1, the terminal apparatus determines to access the network device; or if a value of the cellBarred field is 0, the terminal apparatus determines not to access the network device. This is also true the other way around.

In a possible implementation, if the terminal apparatus is the first-type REDCAP terminal, the terminal apparatus determines, based on the first indication information, whether to access the network device.

For example, the first indication information indicates, by using one bit in the spare field in the MIB, whether the first-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the first indication information indicates, by using the cellBarred field in the MIB, whether the first-type REDCAP terminal is allowed to access the network device. If a value of the cellBarred field is 1, the terminal apparatus determines to access the network device; or if a value of the cellBarred field is 0, the terminal apparatus determines not to access the network device. This is also true the other way around.

For example, the first indication information includes one bit in the reserved field in the DCI, to indicate whether the first-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the first indication information includes one bit in the SIB1 information block, to indicate whether the first-type REDCAP terminal is allowed to access the network device. If a value of the bit is 1, the terminal apparatus determines to access the network device; or if a value of the bit is 0, the terminal apparatus determines not to access the network device. This is also true the other way around.

In a possible implementation, for the manner 1, if the terminal apparatus is the second-type REDCAP terminal, the terminal apparatus determines, based on the second indication information, whether to access the network device.

For example, the second indication information indicates, by using one bit in the spare field in the MIB, whether the second-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the second indication information indicates, by using one bit in the reserved field in the additional PBCH payload, whether the second-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the second indication information includes one bit in the reserved field in the DCI, to indicate whether the second-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the second indication information includes one bit in the SIB1 information block, to indicate whether the second-type REDCAP terminal is allowed to access the network device. If a value of the bit is 1, the terminal apparatus determines to access the network device; or if a value of the bit is 0, the terminal apparatus determines not to access the network device. This is also true the other way around.

In a possible implementation, for the manner 2, if the terminal apparatus is the second-type REDCAP terminal, the terminal apparatus determines, based on the first indication information and the second indication information, whether to access the network device.

For example, the first indication information indicates, by using one bit in the spare field in the MIB, whether the first-type REDCAP terminal is allowed to access the network device and whether the second-type REDCAP terminal is allowed to access the network device, and the second indication information indicates, by using one bit in the reserved field in the additional PBCH payload, whether the second-type REDCAP terminal is allowed to access the network device. If a value of the bit in the spare field is 0, the terminal apparatus determines not to access the network device; if a value of the bit in the spare field is 1, and if a value of the bit in the reserved field is 1, the terminal apparatus determines to access the network device; or if a value of the bit in the spare field is 1, and a value of the bit in the reserved field is 0, the terminal apparatus determines not to access the network device. Alternatively, if a value of the bit in the spare field is 1, the terminal apparatus determines not to access the network device; if a value of the bit in the spare field is 0 and a value of the bit in the reserved field is 0, the terminal apparatus determines to access the network device; or if a value of the bit in the spare field is 0 and a value of the bit in the reserved field is 1, the terminal apparatus determines not to access the network device.

For example, the first indication information includes one bit in the reserved field in the DCI, to indicate whether the first-type REDCAP terminal is allowed to access the network device and whether the second-type REDCAP terminal is allowed to access the network device, and the second indication information includes one bit in the SIB1 information block, to indicate whether the second-type REDCAP terminal is allowed to access the network device. If a value of the bit in the reserved field is 0, the terminal apparatus determines not to access the network device; if a value of the bit in the reserved field is 1, and if a value of the bit in the SIB1 information block is 1, the terminal apparatus determines to access the network device; or if a value of the bit in the reserved field is 1, and a value of the bit in the SIB1 information block is 0, the terminal apparatus determines not to access the network device. Alternatively, if a value of the bit in the reserved field is 1, the terminal apparatus determines not to access the network device; if a value of the bit in the reserved field is 0 and a value of the bit in the SIB1 information block is 0, the terminal apparatus determines to access the network device; or if a value of the bit in the reserved field is 0 and a value of the bit in the SIB1 information block is 1, the terminal apparatus determines not to access the network device.

Based on the method shown in FIG. 3, the network device may send, to the terminal apparatus, the first information indicating whether the first-type REDCAP terminal is allowed to access the network device and whether the second-type REDCAP terminal is allowed to access the network device. After receiving the first information, the terminal apparatus may determine whether to access the network device. In this way, the network device can control a number of first-type REDCAP terminals and second-type REDCAP terminals that access the network device, to ensure transmission performance of the network managed by the network device.

It may be understood that, compared with a common terminal, the REDCAP terminal has a smaller bandwidth. Therefore, when the network device schedules resources for the REDCAP terminal and the common terminal, different processing manners are required. For example, when scheduling a resource for the REDCAP terminal, the network device cannot schedule a frequency domain resource that exceeds a maximum bandwidth of the REDCAP terminal. In addition, compared with the common terminal, the RED-CAP terminal has a smaller number of antennas. This means that a receive antenna gain of the REDCAP terminal is smaller. Therefore, when scheduling the REDCAP terminal to perform downlink receiving, the network device may need to use a lower coding bit rate or perform repeated transmission, to improve downlink transmission reliability.

In conclusion, in a process of communicating with the terminal apparatus, the network device has different processing manners for the REDCAP terminal and the common terminal. Therefore, the REDCAP terminal needs to report a type of the REDCAP terminal at an appropriate time point. For example, the REDCAP terminal may report the type of the REDCAP terminal in a random access procedure, or the REDCAP terminal may report the type of the REDCAP terminal by using radio resource control (radio resource control, RRC) signaling after random access succeeds. In this way, the network device may allocate an appropriate resource to the REDCAP terminal based on the type of the REDCAP terminal, to improve transmission reliability of the REDCAP terminal. It should be understood that if the REDCAP terminal reports the type of the REDCAP terminal earlier, the network device may identify the type of the REDCAP terminal earlier, to prepare for subsequent transmission, to improve transmission reliability.

Figure 4:
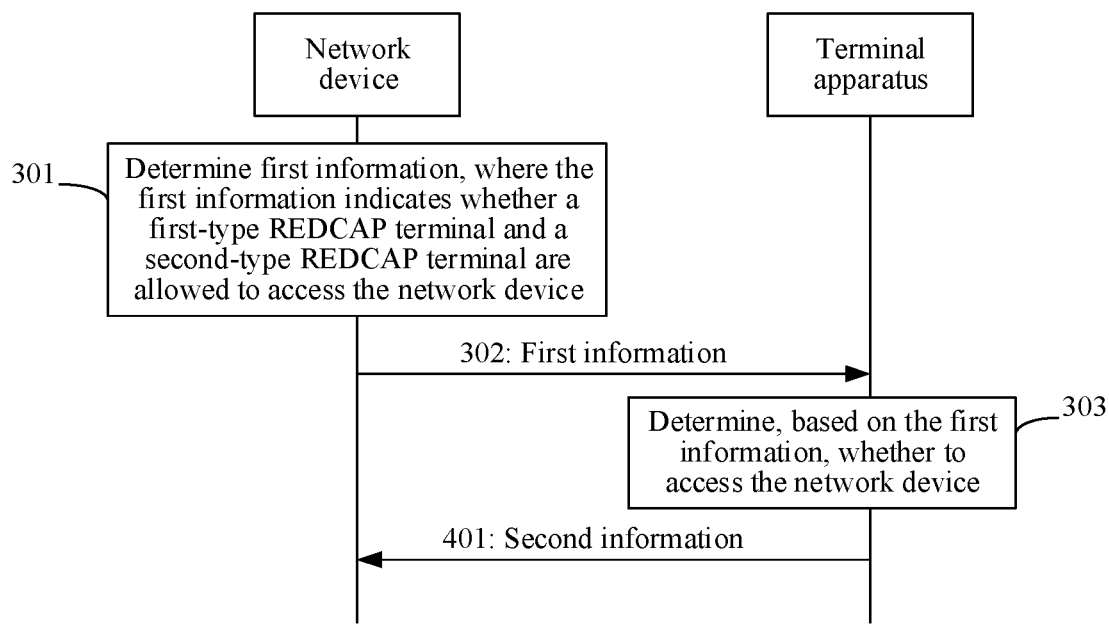
FIG. 4 is a second schematic flowchart of a network device accessing method according to an embodiment of this application.

Optionally, in a possible implementation of the method shown in FIG. 3, when the first information indicates that the first-type REDCAP terminal is allowed to access the network device, when the first information indicates that the second-type REDCAP terminal is allowed to access the network device, or when the first information indicates that the first-type REDCAP terminal is allowed to access the network device and the second-type REDCAP terminal is allowed to access the network device, a terminal apparatus that is allowed to access the network device and that is indicated in the first information may report a type of the terminal apparatus to the network device by using second information, so that the network device identifies the type of the terminal apparatus. Specifically, as shown in FIG. 4, the method shown in FIG. 3 further includes step 401.

Step 401: The terminal apparatus sends the second information to the network device.

The second information indicates that the terminal apparatus is the first-type REDCAP terminal or the second-type REDCAP terminal. For example, if the terminal apparatus is the first-type REDCAP terminal, the second information indicates that the terminal apparatus is the first-type RED-CAP terminal. If the terminal apparatus is the second-type REDCAP terminal, the second information indicates that the terminal apparatus is the second-type REDCAP terminal.

In a possible implementation, the second information is carried on a physical random access channel (PRACH). A resource of the PRACH corresponds to the first-type RED-CAP terminal or the second-type REDCAP terminal. The resource of the PRACH includes at least one of the following: a time domain resource of the PRACH, a frequency domain resource of the PRACH, or a code domain resource of the PRACH. For example, the time domain resource of the PRACH and the frequency domain resource of the PRACH may be a time domain resource and a frequency domain resource of a random access channel occasion (RACH occasion, RO), and the code domain resource of the PRACH may be a preamble used by the terminal apparatus to send the PRACH on the RO.

The resource of the PRACH is configured by the network device for the terminal apparatus. The network device may configure a PRACH resource corresponding to the first-type REDCAP terminal and/or a PRACH resource corresponding to the second-type REDCAP terminal for the terminal apparatus. Specifically, refer to the following four example cases:

Case 1: When the terminal apparatus is the first-type REDCAP terminal, and the first information indicates that the first-type REDCAP terminal is allowed to access the network device, the network device configures the PRACH resource corresponding to the first-type REDCAP terminal for the first-type REDCAP terminal. The terminal apparatus sends the second information to the network device by using the PRACH resource corresponding to the first-type RED-CAP terminal.

Case 2: When the terminal apparatus is the first-type REDCAP terminal and the first information indicates that the first-type REDCAP terminal is allowed to access the network device, or when the terminal apparatus is the first-type REDCAP terminal and the first information indicates that the first-type REDCAP terminal is allowed to access the network device and the second-type REDCAP terminal is allowed to access the network device, the network device configures the PRACH resource corresponding to the first-type REDCAP terminal for the first-type RED-CAP terminal, and configures the PRACH resource corresponding to the second-type REDCAP terminal for the second-type REDCAP terminal. The terminal apparatus sends the second information to the network device by using the PRACH resource corresponding to the first-type RED-CAP terminal.

Case 3: When the terminal apparatus is the second-type REDCAP terminal, and the first information indicates that the second-type REDCAP terminal is allowed to access the network device, the network device configures the PRACH resource corresponding to the second-type REDCAP terminal for the second-type REDCAP terminal. The terminal apparatus sends the second information to the network device by using the PRACH resource corresponding to the second-type REDCAP terminal.

Case 4: When the terminal apparatus is the second-type REDCAP terminal and the first information indicates that the second-type REDCAP terminal is allowed to access the network device, or when the terminal apparatus is the second-type REDCAP terminal and the first information indicates that the first-type REDCAP terminal is allowed to access the network device and the second-type REDCAP terminal is allowed to access the network device, the network device configures the PRACH resource corresponding to the first-type REDCAP terminal for the first-type REDCAP terminal, and configures the PRACH resource corresponding to the second-type REDCAP terminal for the second-type REDCAP terminal. The terminal apparatus sends the second information to the network device by using the PRACH resource corresponding to the second-type REDCAP terminal.

It may be understood that the PRACH resource may alternatively be predefined. For example, the PRACH resource may be defined in a protocol.

It may be understood that the PRACH resource corresponding to the first-type REDCAP terminal is different from the PRACH resource corresponding to the second-type REDCAP terminal.

In another possible implementation, the second information is carried in a Msg3, a MsgA, or RRC signaling. In other words, the terminal apparatus may report the type of the terminal apparatus in the Msg3, the MsgA, or the RRC signaling. For descriptions of the Msg3 and the MsgA, refer to corresponding descriptions in FIG. 1.

Further, the second information includes a type identifier of the terminal apparatus. For example, an identifier of the first-type REDCAP terminal is ID 1, and an identifier of the second-type REDCAP terminal is ID 2. If the second information includes ID 1, the second information indicates that the type of the terminal apparatus is the first-type REDCAP terminal. If the second information includes ID 2, the second information indicates that the type of the terminal apparatus is the second-type REDCAP terminal.

It may be understood that, if the network device indicates that the common terminal is allowed to access the network device, the common terminal may or may not report a terminal type. When the common terminal does not report the terminal type, if the network device does not receive a type reported by a terminal apparatus, the network device may determine that the terminal apparatus is a common terminal. The common terminal may also report the type of the terminal apparatus to the network device by using a plurality of methods such as a PRACH, a Msg3, a MsgA, or RRC signaling. For details, refer to the descriptions of reporting the terminal type by the REDCAP terminal in step 401. Details are not described again.

Correspondingly, the network device receives the second information from the terminal apparatus. Subsequently, the network device may determine the type of the terminal apparatus based on the second information.

For example, for the foregoing case 1 and case 2, the network device determines that the terminal apparatus is the first-type REDCAP terminal. For the foregoing case 3 and case 4, the network device determines that the terminal apparatus is the second-type REDCAP terminal.

For example, an identifier of the first-type REDCAP terminal is ID 1, and an identifier of the second-type REDCAP terminal is ID 2. If the second information includes ID 1, the network device determines that the type of the terminal apparatus is the first-type REDCAP terminal. If the second information includes ID 2, the network device determines that the type of the terminal apparatus is the second-type REDCAP terminal.

Based on the method shown in FIG. 4, the terminal apparatus may report the type of the terminal apparatus to the network device by using a plurality of methods such as the PRACH, the Msg3, the MsgA, or the RRC signaling, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

Figure 5:
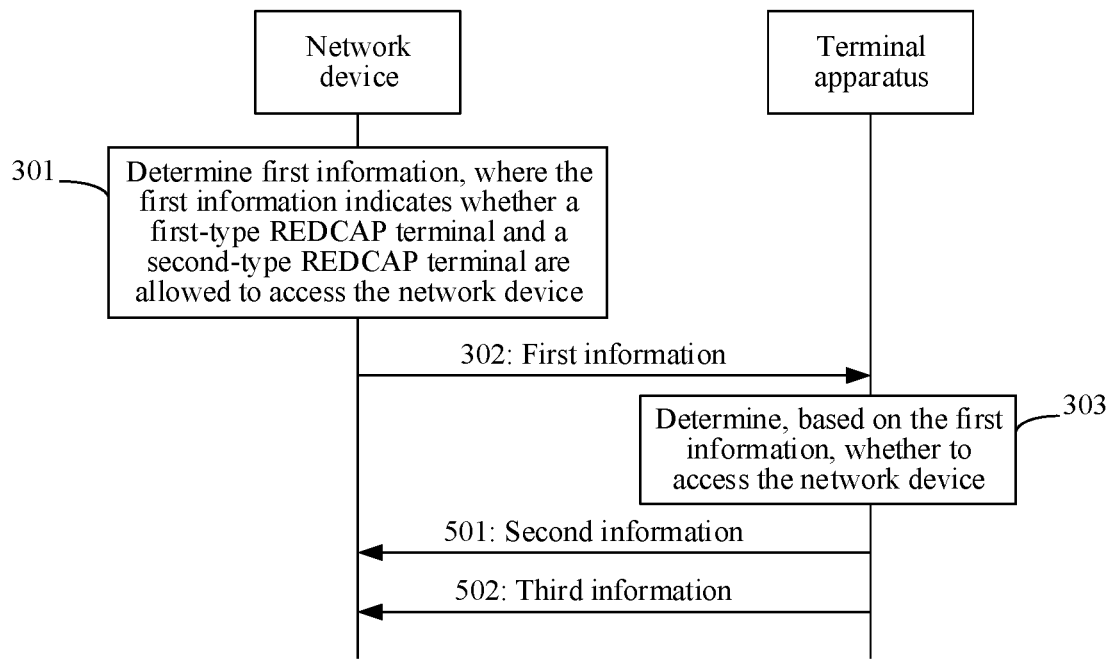
FIG. 5 is a third schematic flowchart of a network device accessing method according to an embodiment of this application.

Optionally, in a possible implementation of the method shown in FIG. 3, when a terminal apparatus is the first-type REDCAP terminal or the second-type REDCAP terminal, and the first information indicates that the first-type REDCAP terminal and the second-type REDCAP terminal are allowed to access the network device, the terminal apparatus reports a type of the terminal apparatus to the network device by using second information and third information, so that the network device identifies the type of the terminal apparatus. Specifically, as shown in FIG. 5, the method shown in FIG. 3 further includes step 501 and step 502.

Step 501: The terminal apparatus sends the second information to the network device.

In a possible implementation, the second information is carried on a PRACH. A resource of the PRACH corresponds to the REDCAP terminal. The resource of the PRACH includes at least one of the following: a time domain resource of the PRACH, a frequency domain resource of the PRACH, or a code domain resource of the PRACH.

The resource of the PRACH is configured by the network device for the terminal apparatus. The network device may configure a PRACH resource corresponding to the REDCAP terminal for the terminal apparatus; the network device may configure a PRACH resource corresponding to the REDCAP terminal and a PRACH resource corresponding to the common terminal for the terminal apparatus; or the network device may configure a PRACH resource corresponding to the first-type REDCAP terminal and a PRACH resource corresponding to the second-type REDCAP terminal for the terminal apparatus. Specifically, refer to the following two example cases:

Case 5: When the network device configures a PRACH resource corresponding to the REDCAP terminal for the terminal apparatus, or when the network device configures a PRACH resource corresponding to the REDCAP terminal and a PRACH resource corresponding to the common terminal for the terminal apparatus, if the terminal apparatus is the first-type REDCAP terminal or the second-type REDCAP terminal, the terminal apparatus sends the second information to the network device by using the PRACH resource corresponding to the REDCAP terminal. The second information indicates that the terminal apparatus is a REDCAP terminal.

In this case, the first-type REDCAP terminal and the second-type REDCAP terminal share a PRACH resource. Therefore, the second information can indicate that the terminal apparatus is a REDCAP terminal or a REDCAP-type terminal, but cannot indicate whether the terminal apparatus is specifically the first-type REDCAP terminal or the second-type REDCAP terminal.

Case 6: When the network device configures a PRACH resource corresponding to the first-type REDCAP terminal and the common terminal and a PRACH resource corresponding to the second-type REDCAP terminal for the terminal apparatus, if the terminal apparatus is the first-type REDCAP terminal, the terminal apparatus sends the second information to the network device by using the PRACH resource corresponding to the first-type REDCAP terminal and the common terminal. The second information indicates that the terminal apparatus is one of the first-type REDCAP terminal and the common terminal. If the terminal apparatus is the second-type REDCAP terminal, the terminal apparatus sends the second information to the network device by using the PRACH resource corresponding to the second-type REDCAP terminal, where the second information indicates that the terminal apparatus is the second-type REDCAP terminal.

In this case, the first-type REDCAP terminal and the common terminal share a PRACH resource. Therefore, if the terminal apparatus is the first-type REDCAP terminal, the second information can indicate that the terminal apparatus is one of the first-type REDCAP terminal and the common terminal, but cannot indicate whether the terminal apparatus is the first-type REDCAP terminal or the common terminal. If the terminal apparatus is the second-type REDCAP terminal, the second information may directly indicate that the terminal apparatus is the second-type REDCAP terminal.

Correspondingly, the network device receives the second information from the terminal apparatus.

For the foregoing case 5, the network device may determine, based on the second information, that the terminal apparatus is a REDCAP terminal.

For the foregoing case 6, the network device may determine, based on the second information, that the terminal apparatus is one of the first-type REDCAP terminal and the common terminal; or the network device determines, based on the second information, that the terminal apparatus is the second-type REDCAP terminal.

Step 502: The terminal apparatus sends the third information to the network device.

In a possible implementation, the third information is carried in a Msg3, a MsgA, or RRC signaling.

It may be understood that when the network device cannot determine the type of the terminal apparatus based on the second information, the terminal apparatus sends the third information to the network device. For example, when the network device determines, based on the second information, that the terminal apparatus is a REDCAP terminal, or when the network device determines, based on the second information, that the terminal apparatus is one of the first-type REDCAP terminal and the common terminal, the terminal apparatus sends the third information to the network device.

In a possible implementation, when the network device determines, based on the second information, that the terminal apparatus is a REDCAP terminal, the third information indicates that the terminal apparatus is the first-type REDCAP terminal or the second-type REDCAP terminal. For example, if the terminal apparatus is the first-type REDCAP terminal, the third information indicates that the terminal apparatus is the first-type REDCAP terminal. If the terminal apparatus is the second-type REDCAP terminal, the third information indicates that the terminal apparatus is the second-type REDCAP terminal.

Further, the third information includes a type identifier of the terminal apparatus. For example, an identifier of the first-type REDCAP terminal is ID 1, and an identifier of the second-type REDCAP terminal is ID 2. If the third information includes ID 1, the third information indicates that the type of the terminal apparatus is the first-type REDCAP terminal. If the third information includes ID 2, the third information indicates that the type of the terminal apparatus is the second-type REDCAP terminal.

In a possible implementation, when the network device determines, based on the second information, that the terminal apparatus is one of the first-type REDCAP terminal and the common terminal, the third information indicates that the terminal apparatus is the first-type REDCAP terminal.

Further, the third information includes a type identifier of the terminal apparatus. For example, an identifier of the first-type REDCAP terminal is ID 1. If the third information includes ID 1, the third information indicates that the type of the terminal apparatus is the first-type REDCAP terminal.

It may be understood that, if the network device indicates that the common terminal is allowed to access the network device, the common terminal may or may not report a terminal type. When the common terminal does not report the terminal type, if the network device does not receive a type reported by a terminal apparatus, the network device may determine that the terminal apparatus is a common terminal. The common terminal may also report the type of the terminal apparatus to the network device by using a plurality of methods such as a PRACH, a Msg3, a MsgA, or RRC signaling. For details, refer to the descriptions of reporting the terminal type by the REDCAP terminal in step 501 and step 502. Details are not described again.

Correspondingly, the network device receives the third information from the terminal apparatus.

Further, the network device determines the type of the terminal apparatus based on the third information.

For example, when the network device determines, based on the second information, that the terminal apparatus is a REDCAP terminal, if the third information indicates that the terminal apparatus is the first-type REDCAP terminal, the network device determines that the type of the terminal apparatus is the first-type REDCAP terminal; or if the third information indicates that the terminal apparatus is the second-type REDCAP terminal, the network device determines that the type of the terminal apparatus is the second-type REDCAP terminal.

For example, when the network device determines, based on the second information, that the terminal apparatus is one of the first-type REDCAP terminal and the common terminal, if the third information indicates that the terminal apparatus is the first-type REDCAP terminal, the network device determines that the type of the terminal apparatus is the first-type REDCAP terminal.

Based on the method shown in FIG. 5, the terminal apparatus may report the type of the terminal apparatus to the network device in the second information and the third information, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability. In addition, in the method shown in FIG. 5, the first-type REDCAP terminal can share a PRACH resource with the second-type REDCAP terminal, or the first-type REDCAP terminal can share a PRACH resource with the common terminal. In this way, excessive division of the PRACH resource can be avoided, that is, excessive reduction of a random access capacity is avoided.

It may be understood that, in addition to the foregoing case in which the REDCAP terminal includes the first-type REDCAP terminal and the second-type REDCAP terminal, the REDCAP terminal may further include a third-type REDCAP terminal. A frequency range in which the third-type REDCAP terminal operates is different from a frequency range in which the first-type REDCAP terminal and the second-type REDCAP terminal operate. For example, the frequency range in which the first-type REDCAP terminal and the second-type REDCAP terminal operate is FR1, the frequency range in which the third-type REDCAP terminal operates is greater than or equal to 6 GHz, and the frequency range is denoted as FR2.

The following describes the network device access method provided in embodiments of this application by using an example in which the REDCAP terminal includes the first-type REDCAP terminal and the second-type REDCAP terminal, or the REDCAP terminal includes the third-type REDCAP terminal.

Figure 6:
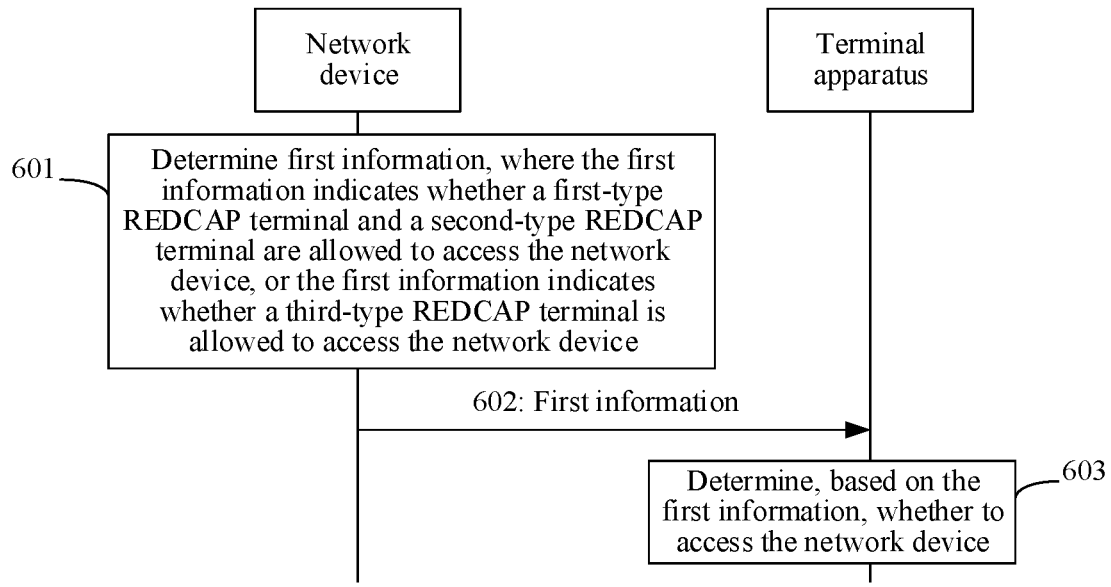
FIG. 6 is a fourth schematic flowchart of a network device accessing method according to an embodiment of this application.

FIG. 6 shows a network device accessing method according to an embodiment of this application. The network device accessing method includes step 601 to step 603.

Step 601: A network device determines first information.

The network device may be the network device 101 in FIG. 1.

The first information may indicate whether a REDCAP terminal is allowed to access the network device. The REDCAP terminal includes a first-type REDCAP terminal and a second-type REDCAP terminal. Alternatively, the REDCAP terminal includes a third-type REDCAP terminal. For descriptions of the first-type REDCAP terminal and the second-type REDCAP terminal, refer to the descriptions in step 301. A frequency range in which the third-type REDCAP terminal operates is different from a frequency range in which the first-type REDCAP terminal and the second-type REDCAP terminal operate. For example, the frequency range in which the first-type REDCAP terminal and the second-type REDCAP terminal operate is FR1, and the frequency range in which the third-type REDCAP terminal operates is FR2. When the frequency range in which the third-type REDCAP terminal operates is FR2, for descriptions of the third-type REDCAP terminal, refer to the descriptions in FIG. 1.

It should be noted that, when the REDCAP terminal includes the first-type REDCAP terminal and the second-type REDCAP terminal, for descriptions of the first information, refer to the descriptions in step 301.

The following describes content included in the first information when the REDCAP terminal includes the third-type REDCAP terminal.

In a possible implementation, the first information includes third indication information, where the third indication information may indicate whether the third-type REDCAP terminal is allowed to access the network device. The third indication information has the following four cases:

Case 3.1: The third indication information includes a spare field in a MIB.

For example, the third indication information indicates, by using one bit in the spare field in the MIB, whether the third-type REDCAP terminal is allowed to access the network device. For example, if a value of the bit is 1, the third indication information indicates that the third-type REDCAP terminal is allowed to access the network device; or if a value of the bit is 0, the third indication information indicates that the third-type REDCAP terminal is not allowed to access the network device. This is also true the other way around.

Case 3.2: The third indication information includes an cellBarred field (cellBarred field).

For example, if a value of the cellBarred field is 1, the third indication information indicates that the third-type REDCAP terminal is allowed to access the network device; or if a value of the cellBarred field is 0, the third indication information indicates that the third-type REDCAP terminal is not allowed to access the network device. This is also true the other way around.

It may be understood that, a bandwidth of the third-type REDCAP terminal is similar to a bandwidth of a common terminal, the two terminals may share a CORESET #0, and compatibility is good. In addition, existence of the third-type REDCAP terminal has little impact on network performance. Therefore, the third-type REDCAP terminal may reuse a field of the common terminal for indicating whether the common terminal is allowed to access the network device. That is, in addition to indicating whether the common terminal is allowed to access the network device, the cellBarred field further indicates whether the third-type REDCAP terminal is allowed to access the network device. In addition, the third-type REDCAP terminal reuses the field of the common terminal for indicating whether the common terminal is allowed to access the network device, so that a number of bits may be saved, and the saved bits are used for other purposes. This facilitates backward compatibility extension of a communication system.

Case 3.3: The third indication information is included in a reserved field in DCI.

For example, the third indication information includes one bit in the reserved field in the DCI, to indicate whether the third-type REDCAP terminal is allowed to access the network device. For example, if a value of the bit is 1, the third indication information indicates that the third-type REDCAP terminal is allowed to access the network device; or if a value of the bit is 0, the third indication information indicates that the third-type REDCAP terminal is not allowed to access the network device. This is also true the other way around.

Case 3.4: The third indication information is included in a SIB1 information block.

For example, the third indication information includes one bit in the SIB1 information block, to indicate whether the third-type REDCAP terminal is allowed to access the network device. For example, if a value of the bit is 1, the third indication information indicates that the third-type REDCAP terminal is allowed to access the network device; or if a value of the bit is 0, the third indication information indicates that the third-type REDCAP terminal is not allowed to access the network device. This is also true the other way around.

It may be understood that one bit, in the SIB1 information block, indicating whether the third-type REDCAP terminal is allowed to access the network device may be included in a newly added IE in the SIB1 information block, or may be included in an original IE in the SIB1 information block.

In a possible implementation, the network device determines the first information based on transmission performance of a network managed by the network device. For example, if the transmission performance of the network is greater than or equal to a threshold, the network device does not limit a number of REDCAP terminals; or if the transmission performance of the network is less than the threshold, the network device limits the number of REDCAP terminals.

Step 602: The network device sends the first information to a terminal device.

For descriptions of step 602, refer to the foregoing step 302. Details are not described again.

Step 603: The terminal apparatus determines, based on the first information, whether to access the network device.

The terminal apparatus is the first-type REDCAP terminal, the second-type REDCAP terminal, the third-type REDCAP terminal, or a common terminal.

When the terminal apparatus is the first-type REDCAP terminal, the second-type REDCAP terminal, or the common terminal, for a process in which the terminal apparatus determines, based on the first information, whether to access the network device, refer to the descriptions in step 303. Details are not described again.

The following describes a process in which the terminal apparatus determines, based on the first information, whether to access the network device when the terminal apparatus is the third-type REDCAP terminal.

For example, the third indication information indicates, by using one bit in the spare field in the MIB, whether the third-type REDCAP terminal is allowed to access the network device. If a value of the bit is 1, the terminal apparatus determines to access the network device; or if a value of the bit is 0, the terminal apparatus determines not to access the network device. This is also true the other way around.

For example, the third indication information indicates, by using the cellBarred field in the MIB, whether the third-type REDCAP terminal is allowed to access the network device. If a value of the cellBarred field is 1, the terminal apparatus determines to access the network device; or if a value of the cellBarred field is 0, the terminal apparatus determines not to access the network device. This is also true the other way around.

For example, the third indication information includes one bit in the reserved field in the DCI, to indicate whether the third-type REDCAP terminal is allowed to access the network device. If a value of the bit is 1, the terminal apparatus determines to access the network device; or if a value of the bit is 0, the terminal apparatus determines not to access the network device.

This is also true the other way around.

For example, the third indication information includes one bit in the SIB1 information block, to indicate whether the third-type REDCAP terminal is allowed to access the network device. If a value of the bit is 1, the terminal apparatus determines to access the network device; or if a value of the bit is 0, the terminal apparatus determines not to access the network device. This is also true the other way around.

Based on the method shown in FIG. 6, the network device may send, to the terminal apparatus, the first information indicating whether the first-type REDCAP terminal is allowed to access the network device and whether the second-type REDCAP terminal is allowed to access the network device; or the network device may send, to the terminal apparatus, the first information indicating whether the third-type REDCAP terminal is allowed to access the network device. After receiving the first information, the terminal apparatus may determine whether to access the network device. In this way, the network device can control a number of first-type REDCAP terminals and second-type REDCAP terminals that access the network device, or the network device may control a number of third-type REDCAP terminals that access the network device, to ensure transmission performance of a network managed by the network device.

It may be understood that, compared with a common terminal, the REDCAP terminal has a smaller bandwidth. Therefore, when the network device schedules resources for the REDCAP terminal and the common terminal, different processing manners are required. For example, when scheduling a resource for the REDCAP terminal, the network device cannot schedule a frequency domain resource that exceeds a maximum bandwidth of the REDCAP terminal. In addition, compared with the common terminal, the REDCAP terminal has a smaller number of antennas. This means that a receive antenna gain of the REDCAP terminal is smaller. Therefore, when scheduling the REDCAP terminal to perform downlink receiving, the network device may need to use a lower coding bit rate or perform repeated transmission, to improve downlink transmission reliability.

In conclusion, in a process of communicating with the terminal apparatus, the network device has different processing manners for the REDCAP terminal and the common terminal. Therefore, the REDCAP terminal needs to report a type of the REDCAP terminal at an appropriate time point. For example, the REDCAP terminal may report the type of the REDCAP terminal in a random access procedure, or the REDCAP terminal may report the type of the REDCAP terminal by using RRC signaling after random access succeeds. In this way, the network device may allocate an appropriate resource to the REDCAP terminal based on the type of the REDCAP terminal, to improve transmission reliability of the REDCAP terminal. It should be understood that if the REDCAP terminal reports the type of the REDCAP terminal earlier, the network device may identify the type of the REDCAP terminal earlier, to prepare for subsequent transmission, to improve transmission reliability.

Figure 7:
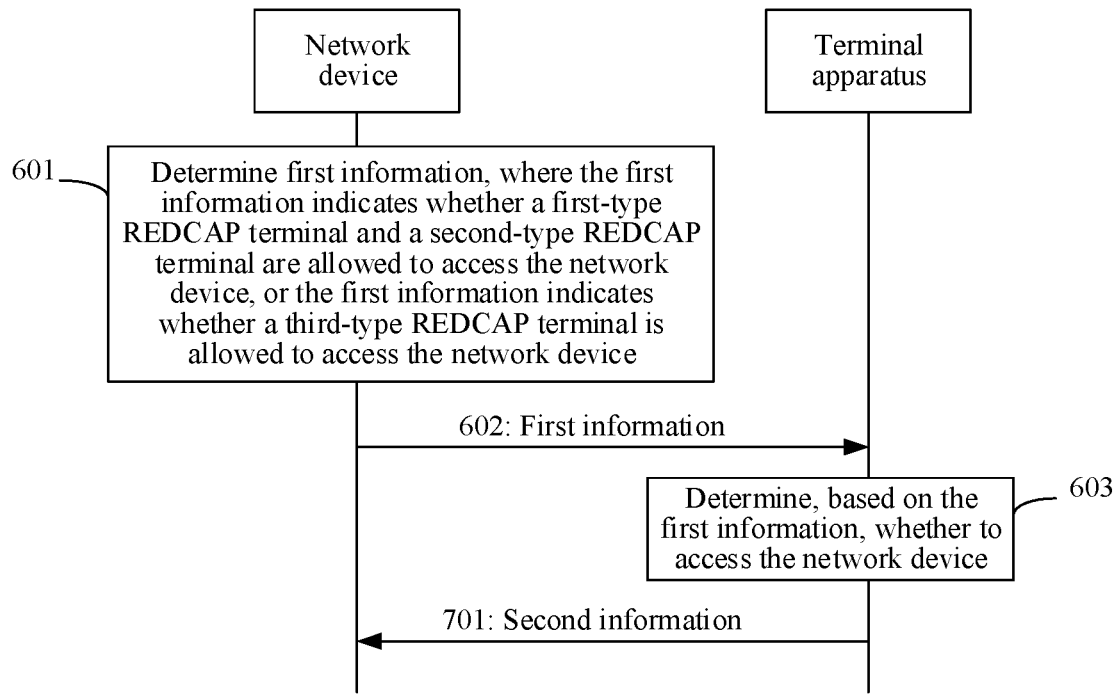
FIG. 7 is a fifth schematic flowchart of a network device accessing method according to an embodiment of this application.

Optionally, in a possible implementation of the method shown in FIG. 6, when the first information indicates that the first-type REDCAP terminal is allowed to access the network device, when the first information indicates that the second-type REDCAP terminal is allowed to access the network device, when the first information indicates that the first-type REDCAP terminal is allowed to access the network device and the second-type REDCAP terminal is allowed to access the network device, or when the first information indicates that the third-type REDCAP terminal is allowed to access the network device, a terminal apparatus that is allowed to access the network device and that is indicated in the first information may report a type of the terminal apparatus to the network device by using second information, so that the network device identifies the type of the terminal apparatus. Specifically, as shown in FIG. 7, the method shown in FIG. 6 further includes step 701.

Step 701: The terminal apparatus sends the second information to the network device.

The second information indicates that the terminal apparatus is the first-type REDCAP terminal, the second-type REDCAP terminal, or the third-type REDCAP terminal. For example, if the terminal apparatus is the first-type REDCAP terminal, the second information indicates that the terminal apparatus is the first-type REDCAP terminal. If the terminal apparatus is the second-type REDCAP terminal, the second information indicates that the terminal apparatus is the second-type REDCAP terminal. If the terminal apparatus is the third-type REDCAP terminal, the second information indicates that the terminal apparatus is the third-type REDCAP terminal.

In a possible implementation, the second information is carried on a PRACH. A resource of the PRACH corresponds to the first-type REDCAP terminal, the second-type REDCAP terminal, or the third-type REDCAP terminal. The resource of the PRACH includes at least one of the following: a time domain resource of the PRACH, a frequency domain resource of the PRACH, or a code domain resource of the PRACH. For example, the time domain resource of the PRACH and the frequency domain resource of the PRACH may be a time domain resource and a frequency domain resource of a random access channel occasion (RACH occasion, RO), and the code domain resource of the PRACH may be a preamble used by the terminal apparatus to send the PRACH on the RO.

When the terminal apparatus is the first-type REDCAP terminal and the first information indicates that the first-type REDCAP terminal is allowed to access the network device, or when the terminal apparatus is the first-type REDCAP terminal and the first information indicates that the first-type REDCAP terminal is allowed to access the network device and the second-type REDCAP terminal is allowed to access the network device, for descriptions of the resource of the PRACH, refer to the descriptions in step 401. Details are not described again.

When the terminal apparatus is the second-type REDCAP terminal and the first information indicates that the second-type REDCAP terminal is allowed to access the network device, or when the terminal apparatus is the second-type REDCAP terminal and the first information indicates that the first-type REDCAP terminal is allowed to access the network device and the second-type REDCAP terminal is allowed to access the network device, for descriptions of the resource of the PRACH, refer to the descriptions in step 401. Details are not described again.

The following describes the resource of the PRACH when the terminal apparatus is the third-type REDCAP terminal and the first information indicates that the third-type REDCAP terminal is allowed to access the network device.

The resource of the PRACH is configured by the network device for the terminal apparatus. The network device may configure a PRACH resource corresponding to the third-type REDCAP terminal for the terminal apparatus.

For example, the network device configures, for the third-type REDCAP terminal, the PRACH resource corresponding to the third-type REDCAP terminal. The terminal apparatus sends the second information to the network device by using the PRACH resource corresponding to the third-type REDCAP terminal.

It may be understood that the network device may further configure, for each type of terminal, a PRACH resource corresponding to the type of terminal. In this way, when reporting a type of a terminal apparatus, the terminal apparatus sends the second information to the network device by using a PRACH resource corresponding to the terminal apparatus.

For example, the network device configures a PRACH resource corresponding to the first-type REDCAP terminal for the first-type REDCAP terminal, configures a PRACH resource corresponding to the second-type REDCAP terminal for the second-type REDCAP terminal, and configures a PRACH resource corresponding to the third-type REDCAP terminal for the third-type REDCAP terminal. If the terminal apparatus is the first-type REDCAP terminal, the terminal apparatus sends the second information to the network device by using the PRACH resource corresponding to the first-type REDCAP terminal. If the terminal apparatus is the second-type REDCAP terminal, the terminal apparatus sends the second information to the network device by using the PRACH resource corresponding to the second-type REDCAP terminal. If the terminal apparatus is the third-type REDCAP terminal, the terminal apparatus sends the second information to the network device by using the PRACH resource corresponding to the third-type REDCAP terminal.

It may be understood that the PRACH resource may alternatively be predefined. For example, the PRACH resource may be defined in a protocol.

In another possible implementation, the second information is carried in a Msg3, a MsgA, or RRC signaling. In other words, the terminal apparatus may report the type of the terminal apparatus in the Msg3, the MsgA, or the RRC signaling. For descriptions of the Msg3 and the MsgA, refer to corresponding descriptions in FIG. 1.

Further, the second information includes a type identifier of the terminal apparatus. For example, an identifier of the first-type REDCAP terminal is ID 1, and an identifier of the second-type REDCAP terminal is ID 2. If the second information includes ID 1, the second information indicates that the type of the terminal apparatus is the first-type REDCAP terminal. If the second information includes ID 2, the second information indicates that the type of the terminal apparatus is the second-type REDCAP terminal.

For example, an identifier of the third-type REDCAP terminal is ID 3. If the second information includes ID 3, the second information indicates that the type of the terminal apparatus is the third-type REDCAP terminal.

It may be understood that, if the network device indicates that the common terminal is allowed to access the network device, the common terminal may or may not report a terminal type. When the common terminal does not report the terminal type, if the network device does not receive a type reported by a terminal apparatus, the network device may determine that the terminal apparatus is a common terminal. The common terminal may also report the type of the terminal apparatus to the network device by using a plurality of methods such as a PRACH, a Msg3, a MsgA, or RRC signaling. For details, refer to the descriptions of reporting the terminal type by the REDCAP terminal in step 701. Details are not described again.

Correspondingly, the network device receives the second information from the terminal apparatus. Subsequently, the network device may determine the type of the terminal apparatus based on the second information.

The terminal apparatus is the first-type REDCAP terminal or the second-type REDCAP terminal. For a process in which the network device determines the type of the terminal apparatus based on the second information, refer to the descriptions in step 401. Details are not described again.

For example, the terminal apparatus sends the second information to the network device by using the PRACH resource corresponding to the third-type REDCAP terminal. The network device determines that the terminal apparatus is the third-type REDCAP terminal.

For example, an identifier of the third-type REDCAP terminal is ID 3. If the second information includes ID 3, the network device determines that the type of the terminal apparatus is the third-type REDCAP terminal.

Based on the method shown in FIG. 7, the terminal apparatus may report the type of the terminal apparatus to the network device by using a plurality of methods such as the PRACH, the Msg3, the MsgA, or the RRC signaling, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability.

Figure 8:
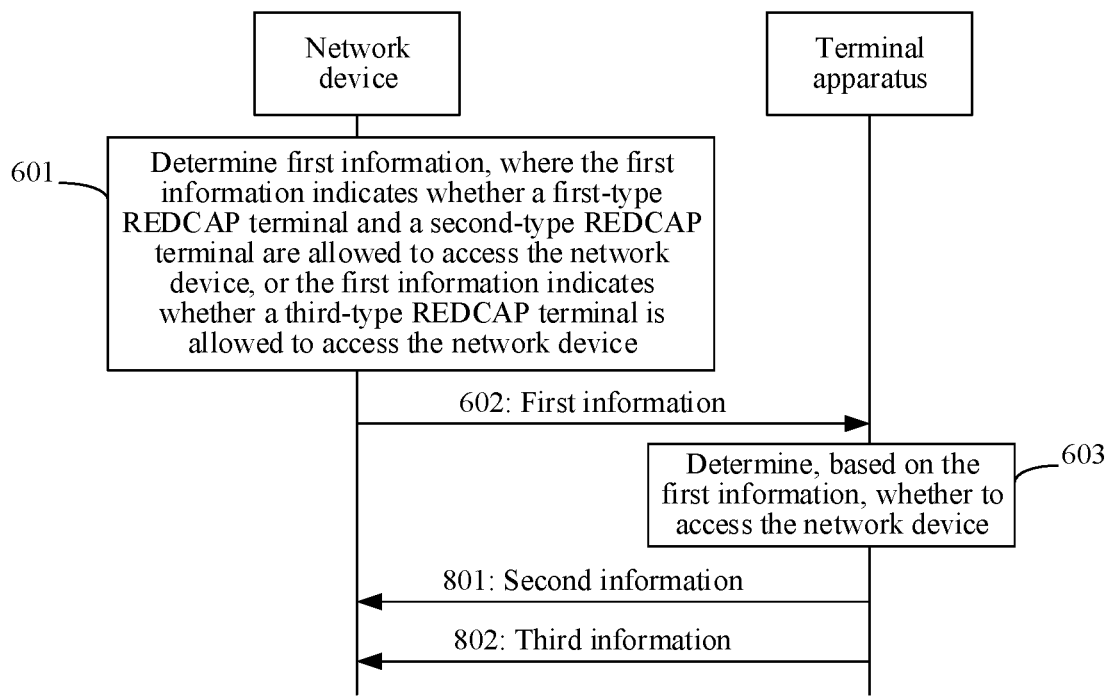
FIG. 8 is a sixth schematic flowchart of a network device accessing method according to an embodiment of this application.

Optionally, in a possible implementation of the method shown in FIG. 6, when a terminal apparatus is the first-type REDCAP terminal or the second-type REDCAP terminal, and the first information indicates that the first-type RED- CAP terminal and the second-type REDCAP terminal are allowed to access the network device, the terminal apparatus reports a type of the terminal apparatus to the network device by using second information and third information, so that the network device identifies the type of the terminal apparatus. Specifically, as shown in FIG. 8, the method shown in FIG. 6 further includes step 801 and step 802.

Step 801: The terminal apparatus sends the second information to the network device.

Step 802: The terminal apparatus sends the third information to the network device.

For descriptions of step 801 and step 802, refer to the descriptions of step 501 and step 502. Details are not described again.

Based on the method shown in FIG. 8, the terminal apparatus may report the type of the terminal apparatus to the network device in the second information and the third information, so that the network device identifies the type of the terminal apparatus. In this way, when the network device schedules the REDCAP terminal to perform uplink transmission or downlink transmission, a scheduled frequency range can be prevented from exceeding a maximum bandwidth of the REDCAP terminal. In addition, when scheduling the REDCAP terminal to perform downlink receiving, the network device can use a lower coding bit rate or perform repeated transmission, to improve downlink transmission reliability. In addition, in the method shown in FIG. 8, the first-type REDCAP terminal can share a PRACH resource with the second-type REDCAP terminal, or the first-type REDCAP terminal can share a PRACH resource with the common terminal. In this way, excessive division of the PRACH resource can be avoided, that is, excessive reduction of a random access capacity is avoided.

The foregoing mainly describes the solutions provided in embodiments of this application from a perspective of interaction between network elements. It may be understood that to implement the foregoing functions, the foregoing network device or terminal apparatus includes corresponding hardware structures and/or software modules for implementing the functions. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device or the terminal apparatus may be divided based on the foregoing method example. For example, each functional module may be divided according to corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 9:
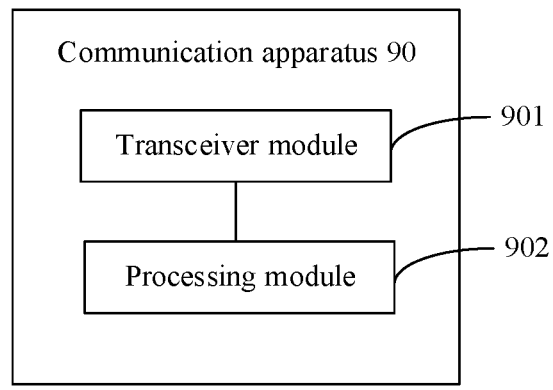
FIG. 9 is a first schematic diagram of a structure of a communication apparatus according to an embodiment of this application.

FIG. 9 is a schematic diagram of a structure of a communication apparatus 90 according to an embodiment of this application. For example, the communication apparatus 90 is a terminal apparatus 90. For example, the terminal apparatus 90 is, for example, the terminal apparatus in the embodiment shown in FIG. 3, the embodiment shown in FIG. 4, or the embodiment shown in FIG. 5.

The terminal apparatus 90 includes a transceiver module 901 and a processing module 902. For example, the terminal apparatus 90 may be a terminal apparatus, or may be a chip used in the terminal apparatus or another combined device, component, the like that has a function of the terminal apparatus. When the terminal apparatus 90 is the terminal apparatus, the transceiver module 901 may be a transceiver, where the transceiver may include an antenna, a radio frequency circuit, and the like; and the processing module 902 may be a processor (or a processing circuit), for example, a baseband processor, where the baseband processor may include one or more CPUs. When the terminal apparatus 90 is the component that has the function of the terminal apparatus, the transceiver module 901 may be a radio frequency unit, and the processing module 902 may be a processor (or a processing circuit), for example, a baseband processor. When the terminal apparatus 90 is a chip system, the transceiver module 901 may be an input/output interface of a chip (for example, a baseband chip), and the processing module 902 may be a processor (or a processing circuit) of the chip system, and may include one or more central processing units. It should be understood that the transceiver module 901 in this embodiment of this application may be implemented by a transceiver or a transceiver-related circuit component, and the processing module 902 may be implemented by a processor or a processor-related circuit component (or referred to as a processing circuit).

For example, the transceiver module 901 may be configured to perform all sending and receiving operations performed by the terminal apparatus in the embodiment shown in FIG. 3, for example, step 302, and/or configured to support another process of the technology described in this specification. The processing module 902 may be configured to perform all operations, except sending and receiving operations, performed by the terminal apparatus in the embodiment shown in FIG. 3, for example, step 303, and/or configured to support another process of the technology described in this specification.

For another example, the transceiver module 901 may be configured to perform all sending and receiving operations performed by the terminal apparatus in the embodiment shown in FIG. 4, for example, step 302 and step 401, and/or configured to support another process of the technology described in this specification. The processing module 902 may be configured to perform all operations, except sending and receiving operations, performed by the terminal apparatus in the embodiment shown in FIG. 4, for example, step 303, and/or configured to support another process of the technology described in this specification.

For another example, the transceiver module 901 may be configured to perform all sending and receiving operations performed by the terminal apparatus in the embodiment shown in FIG. 5, for example, step 302, step 501, and step 502, and/or configured to support another process of the technology described in this specification. The processing module 902 may be configured to perform all operations, except sending and receiving operations, performed by the terminal apparatus in the embodiment shown in FIG. 3, for example, step 303, and/or configured to support another process of the technology described in this specification.

The transceiver module 901 is configured to receive first information from a network device, where the first information indicates whether a REDCAP terminal is allowed to access the network device, and the REDCAP terminal includes a first-type REDCAP terminal and a second-type REDCAP terminal, where the first-type REDCAP terminal and the second-type REDCAP terminal operate in a same frequency range, and a bandwidth of the second-type RED-CAP terminal is less than that of the first-type REDCAP terminal and/or a number of receive antennas of the second-type REDCAP terminal is less than that of the first-type REDCAP terminal.

The processing module 902 is configured to determine, based on the first information, whether to access the network device, where the communication apparatus is the first-type REDCAP terminal or the second-type REDCAP terminal.

In a possible implementation, the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type RED-CAP terminal is allowed to access the network device, and the first indication information and the second indication information indicate whether the second-type REDCAP terminal is allowed to access the network device.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload.

In a possible implementation, the first information is included in an SSB, and the SSB includes the MIB and the additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1.

In a possible implementation, the first information indicates that the first-type REDCAP terminal and/or the second-type REDCAP terminal are/is allowed to access the network device. The transceiver module 901 is configured to send second information to the network device, where the second information indicates that the communication apparatus is the first-type REDCAP terminal or the second-type REDCAP terminal.

In a possible implementation, the second information is carried on a PRACH, a resource of the PRACH corresponds to the first-type REDCAP terminal or the second-type RED-CAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the network device. The transceiver module 901 is further configured to send second information to the network device, where the second information indicates that the communication apparatus is a REDCAP terminal. The transceiver module 901 is further configured to send third information to the network device, where the third information indicates that the communication apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

For another function that can be implemented by the terminal apparatus 90, refer to related descriptions of the embodiment shown in FIG. 3, the method embodiment shown in FIG. 4, or the embodiment shown in FIG. 5. Details are not described again.

Figure 10:
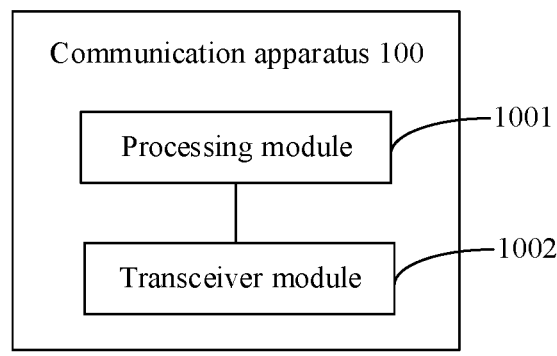
FIG. 10 is a second schematic diagram of a structure of a communication apparatus according to an embodiment of this application.

FIG. 10 is a schematic diagram of a structure of a communication apparatus 100 according to an embodiment of this application. For example, the communication apparatus 100 is a network device 100. For example, the network device 100 is, for example, the network device in the embodiment shown in FIG. 3, the embodiment shown in FIG. 4, or the embodiment shown in FIG. 5.

The network device 100 includes a processing module 1001 and a transceiver module 1002. For example, the network device 100 may be a network device, or may be a chip used in the network device or another combined device, component, or the like that has a function of the network device. When the network device 100 is the network device, the processing module 1001 may be a processor (or a processing circuit), for example, a baseband processor. The baseband processor may include one or more CPUs. The transceiver module 1002 may be a transceiver, and the transceiver may include an antenna, a radio frequency circuit, and the like. When the network device 100 is the component having the function of the network device, the processing module 1001 may be a processor (or a processing circuit), for example, a baseband processor. The transceiver module 1002 may be a radio frequency unit. When the network device 100 is a chip system, the processing module 1001 may be a processor (or a processing circuit) of the chip system, and may include one or more central processing units. The transceiver module 1002 may be an input/output interface of a chip (for example, a baseband chip). It should be understood that the processing module 1001 in this embodiment of this application may be implemented by a processor or a processor-related circuit component (or referred to as a processing circuit), and the transceiver module 1002 may be implemented by a transceiver or a transceiver-related circuit component.

For example, the processing module 1001 may be configured to perform all operations, except sending and receiving operations, performed by the network device in the embodiment shown in FIG. 3, for example, step 301, and/or configured to support another process of the technology described in this specification. The transceiver module 1002 may be configured to perform all sending and receiving operations performed by the network device in the embodiment shown in FIG. 3, for example, step 302, and/or configured to support another process of the technology described in this specification.

For another example, the processing module 1001 may be configured to perform all operations, except sending and receiving operations, performed by the network device in the embodiment shown in FIG. 4, for example, step 301, and/or configured to support another process of the technology described in this specification. The transceiver module 1002 may be configured to perform all sending and receiving operations performed by the network device in the embodiment shown in FIG. 4, for example, step 302 and step 401, and/or configured to support another process of the technology described in this specification.

For another example, the processing module 1001 may be configured to perform all operations, except sending and receiving operations, performed by the network device in the embodiment shown in FIG. 5, for example, step 301, and/or configured to support another process of the technology described in this specification. The transceiver module 1002 may be configured to perform all sending and receiving operations performed by the network device in the embodiment shown in FIG. 5, for example, step 302, step 501, and step 502, and/or configured to support another process of the technology described in this specification.

The processing module 1001 is configured to determine first information, where the first information indicates whether a REDCAP terminal is allowed to access the communication apparatus, and the REDCAP terminal includes a first-type REDCAP terminal and a second-type REDCAP terminal, where the first-type REDCAP terminal and the second-type REDCAP terminal operate in a same frequency range, and a bandwidth of the second-type REDCAP terminal is less than that of the first-type REDCAP terminal and/or a number of receive antennas of the second-type REDCAP terminal is less than that of the first-type REDCAP terminal.

The transceiver module 1002 is configured to send the first information to a terminal apparatus.

In a possible implementation, the first information includes first indication information and second indication information, where the first indication information indicates whether the first-type REDCAP terminal is allowed to access the communication apparatus, and the second indication information indicates whether the second-type REDCAP terminal is allowed to access the communication apparatus; or the first indication information indicates whether the first-type REDCAP terminal is allowed to access the communication apparatus, and the first indication information and the second indication information indicate whether the second-type REDCAP terminal is allowed to access the communication apparatus.

In a possible implementation, the first indication information indicates whether the first-type REDCAP terminal is allowed to access the communication apparatus, and the second indication information indicates whether the second-type REDCAP terminal is allowed to access the communication apparatus; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the communication apparatus, and the first indication information and the second indication information indicate whether the second-type REDCAP terminal is allowed to access the communication apparatus; and the first indication information includes a spare field in a MIB, and the second indication information includes a reserved field in an additional PBCH payload.

In a possible implementation, the first information is included in an SSB, and the SSB includes the MIB and the additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1.

In a possible implementation, the first information indicates that the first-type REDCAP terminal and/or the second-type REDCAP terminal are/is allowed to access the communication apparatus. The transceiver module 1002 is configured to receive second information from the terminal apparatus, where the second information indicates that the terminal apparatus is the first-type REDCAP terminal or the second-type REDCAP terminal.

In a possible implementation, the second information is carried on a PRACH, a resource of the PRACH corresponds to the first-type REDCAP terminal or the second-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the communication apparatus. The transceiver module 1002 is further configured to receive second information from the terminal apparatus, where the second information indicates the terminal apparatus is a REDCAP terminal. The transceiver module 1002 is further configured to receive third information from the terminal apparatus, where the third information indicates that the terminal apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

For another function that can be implemented by the network device 100, refer to related descriptions of the embodiment shown in FIG. 3, the method embodiment shown in FIG. 4, or the embodiment shown in FIG. 5. Details are not described again.

Figure 11:
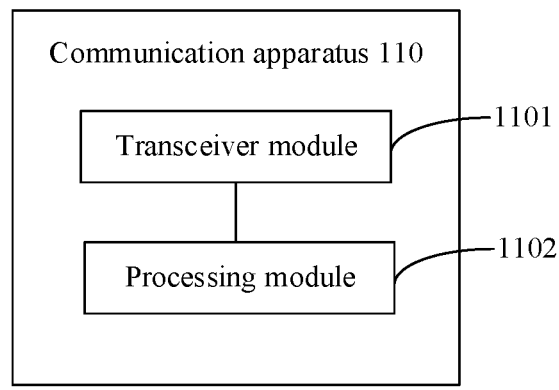
FIG. 11 is a third schematic diagram of a structure of a communication apparatus according to an embodiment of this application.

FIG. 11 is a schematic diagram of a structure of a communication apparatus 110 according to an embodiment of this application. For example, the communication apparatus 110 is a terminal apparatus 110. For example, the terminal apparatus 110 is, for example, the terminal apparatus in the embodiment shown in FIG. 6, the embodiment shown in FIG. 7, or the embodiment shown in FIG. 8.

The terminal apparatus 110 includes a transceiver module 1101 and a processing module 1102. For example, the terminal apparatus 110 may be a terminal apparatus, or may be a chip used in the terminal apparatus or another combined device, component, the like that has a function of the terminal apparatus. When the terminal apparatus 110 is the terminal apparatus, the transceiver module 1101 may be a transceiver, where the transceiver may include an antenna, a radio frequency circuit, and the like; and the processing module 1102 may be a processor (or a processing circuit), for example, a baseband processor, where the baseband processor may include one or more CPUs. When the terminal apparatus 110 is the component that has the function of the terminal apparatus, the transceiver module 1101 may be a radio frequency unit, and the processing module 1102 may be a processor (or a processing circuit), for example, a baseband processor. When the terminal apparatus 110 is a chip system, the transceiver module 1101 may be an input/output interface of a chip (for example, a baseband chip), and the processing module 1102 may be a processor (or a processing circuit) of the chip system, and may include one or more central processing units. It should be understood that the transceiver module 1101 in this embodiment of this application may be implemented by a transceiver or a transceiver-related circuit component, and the processing module 1102 may be implemented by a processor or a processor-related circuit component (or referred to as a processing circuit).

For example, the transceiver module 1101 may be configured to perform all sending and receiving operations performed by the terminal apparatus in the embodiment shown in FIG. 6, for example, step 602, and/or configured to support another process of the technology described in this specification. The processing module 1102 may be configured to perform all operations, except sending and receiving operations, performed by the terminal apparatus in the embodiment shown in FIG. 3, for example, step 603, and/or configured to support another process of the technology described in this specification.

For another example, the transceiver module 1101 may be configured to perform all sending and receiving operations performed by the terminal apparatus in the embodiment shown in FIG. 7, for example, step 602 and step 701, and/or configured to support another process of the technology described in this specification. The processing module 1102 may be configured to perform all operations, except sending and receiving operations, performed by the terminal apparatus in the embodiment shown in FIG. 7, for example, step 603, and/or configured to support another process of the technology described in this specification.

For another example, the transceiver module 1101 may be configured to perform all sending and receiving operations performed by the terminal apparatus in the embodiment shown in FIG. 8, for example, step 602, step 801, and step 802, and/or configured to support another process of the technology described in this specification. The processing module 1102 may be configured to perform all operations, except sending and receiving operations, performed by the terminal apparatus in the embodiment shown in FIG. 8, for example, step 603, and/or configured to support another process of the technology described in this specification.

The transceiver module 1101 is configured to receive first information from a network device, where the first information indicates whether a REDCAP terminal is allowed to access the network device, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal.

The processing module 1102 is configured to determine, based on the first information, whether to access the network device, where the communication apparatus is the first-type REDCAP terminal, the second-type REDCAP terminal, or the third-type REDCAP terminal.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the network device, and the second indication information indicates whether the second-type REDCAP terminal is allowed to access the network device; or the first indication information indicates whether the first-type REDCAP terminal is allowed to access the network device, and the first indication information and the second indication information indicate whether the second-type REDCAP terminal is allowed to access the network device.

In a possible implementation, the first indication information indicates whether the first-type REDCAP terminal is allowed to access the network device, and the second indication information indicates whether the second-type REDCAP terminal is allowed to access the network device; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the network device, and the first indication information and the second indication information indicate whether the second-type REDCAP terminal is allowed to access the network device; and the first indication information includes a spare field in a MIB, and the second indication information includes a reserved field in an additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1.

In a possible implementation, the REDCAP terminal includes the third-type REDCAP terminal; and the first information includes third indication information, where the third indication information indicates whether the third-type REDCAP terminal is allowed to access the network device.

In a possible implementation, the third indication information includes a spare field in a MIB; or the third indication information includes an cellBarred field in the MIB.

In a possible implementation, the first information is included in an SSB, and the SSB includes the MIB and the additional PBCH payload.

In a possible implementation, the third indication information is included in a reserved field in DCI, or the third indication information is included in a SIB1 information block.

In a possible implementation, the first information indicates that the first-type REDCAP terminal, the second-type REDCAP terminal, or the third-type REDCAP terminal is allowed to access the network device; or the first information indicates that the first-type REDCAP terminal and the second-type REDCAP terminal are allowed to access the network device. The transceiver module 1101 is configured to send second information to the network device, where the second information indicates that the communication apparatus is the first-type REDCAP terminal, the second-type REDCAP terminal, or the third-type REDCAP terminal.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the network device. The transceiver module 1101 is further configured to send second information to the network device, where the second information indicates that the communication apparatus is a REDCAP terminal. The transceiver module 1101 is further configured to send third information to the network device, where the third information indicates that the communication apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

For another function that can be implemented by the terminal apparatus 110, refer to related descriptions of the embodiment shown in FIG. 3, the method embodiment shown in FIG. 4, or the embodiment shown in FIG. 5. Details are not described again.

Figure 12:
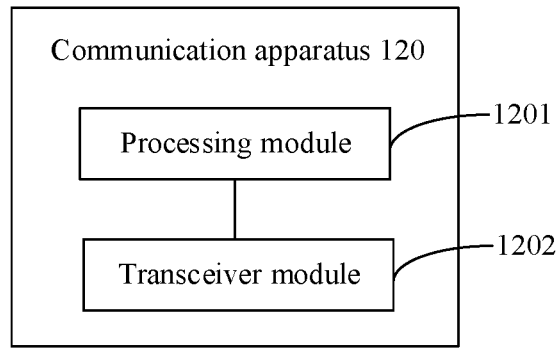
FIG. 12 is a fourth schematic diagram of a structure of a communication apparatus according to an embodiment of this application.

FIG. 12 is a schematic diagram of a structure of a communication apparatus 120 according to an embodiment of this application. For example, the communication apparatus 120 is a network device 120. For example, the network device 120 is the network device in the embodiment shown in FIG. 6, the embodiment shown in FIG. 7, or the embodiment shown in FIG. 8.

The network device 120 includes a processing module 1201 and a transceiver module 1202. For example, the network device 120 may be a network device, or may be a chip used in the network device or another combined device, component, or the like that has a function of the network device. When the network device 120 is the network device, the processing module 1201 may be a processor (or a processing circuit), for example, a baseband processor. The baseband processor may include one or more CPUs. The transceiver module 1202 may be a transceiver, and the transceiver may include an antenna, a radio frequency circuit, and the like. When the network device 120 is the component having the function of the network device, the processing module 1201 may be a processor (or a processing circuit), for example, a baseband processor. The transceiver module 1202 may be a radio frequency unit. When the network device 120 is a chip system, the processing module 1201 may be a processor (or a processing circuit) of the chip system, and may include one or more central processing units. The transceiver module 1202 may be an input/output interface of a chip (for example, a baseband chip). It should be understood that the processing module 1201 in this embodiment of this application may be implemented by a processor or a processor-related circuit component (or referred to as a processing circuit), and the transceiver module 1202 may be implemented by a transceiver or a transceiver-related circuit component.

For example, the processing module 1201 may be configured to perform all operations, except sending and receiving operations, performed by the network device in the embodiment shown in FIG. 6, for example, step 601, and/or configured to support another process of the technology described in this specification. The transceiver module 1202 may be configured to perform all sending and receiving operations performed by the network device in the embodiment shown in FIG. 6, for example, step 602, and/or configured to support another process of the technology described in this specification.

For another example, the processing module 1201 may be configured to perform all operations, except sending and receiving operations, performed by the network device in the embodiment shown in FIG. 7, for example, step 601, and/or configured to support another process of the technology described in this specification. The transceiver module 1202 may be configured to perform all sending and receiving operations performed by the network device in the embodiment shown in FIG. 7, for example, step 602 and step 701, and/or configured to support another process of the technology described in this specification.

For another example, the processing module 1201 may be configured to perform all operations, except sending and receiving operations, performed by the network device in the embodiment shown in FIG. 8, for example, step 601, and/or configured to support another process of the technology described in this specification. The transceiver module 1202 may be configured to perform all sending and receiving operations performed by the network device in the embodiment shown in FIG. 8, for example, step 602, step 801, and step 802, and/or configured to support another process of the technology described in this specification.

The processing module 1201 is configured to determine first information, where the first information indicates whether a REDCAP terminal is allowed to access the communication apparatus, and the REDCAP terminal includes a first-type REDCAP terminal and a second-type REDCAP terminal, or the REDCAP terminal includes a third-type REDCAP terminal, where the first-type REDCAP terminal and the second-type REDCAP terminal operate in a same frequency range, a frequency range in which the third-type REDCAP terminal operates is different from the frequency range in which the first-type REDCAP terminal and the second-type REDCAP terminal operate, and a bandwidth of the second-type REDCAP terminal is less than that of the first-type REDCAP terminal and/or a number of receive antennas of the second-type REDCAP terminal is less than that of the first-type REDCAP terminal.

The transceiver module 1202 is configured to send the first information to a terminal apparatus.

In a possible implementation, the REDCAP terminal includes the first-type REDCAP terminal and the second-type REDCAP terminal; and the first information includes first indication information and second indication information, where the first indication information indicates whether the first-type REDCAP terminal is allowed to access the communication apparatus, and the second indication information indicates whether the second-type REDCAP terminal is allowed to access the communication apparatus; or the first indication information indicates whether the first-type REDCAP terminal is allowed to access the communication apparatus, and the first indication information and the second indication information indicate whether the second-type REDCAP terminal is allowed to access the communication apparatus.

In a possible implementation, the first indication information indicates whether the first-type REDCAP terminal is allowed to access the communication apparatus, and the second indication information indicates whether the second-type REDCAP terminal is allowed to access the communication apparatus; and the first indication information includes a spare field in a MIB, and the second indication information includes a reserved field in an additional PBCH payload; or the first indication information includes an cellBarred field in a MIB, and the second indication information includes a spare field in the MIB or includes a reserved field in an additional PBCH payload.

In a possible implementation, the first indication information indicates whether the first-type REDCAP terminal is allowed to access the communication apparatus, and the first indication information and the second indication information indicate whether the second-type REDCAP terminal is allowed to access the communication apparatus; and the first indication information includes a spare field in a MIB, and the second indication information includes a reserved field in an additional PBCH payload.

In a possible implementation, the first indication information is included in a reserved field in the DCI, and the second indication information is included in the reserved field in the DCI; the first indication information is included in a reserved field in DCI, and the second indication information is included in a SIB1 information block; the first indication information is included in a SIB1 information block, and the second indication information is included in a reserved field in DCI; or the first indication information is included in a SIB1 information block, and the second indication information is included in the SIB1 information block, where the DCI is used for scheduling the SIB1.

In a possible implementation, the first indication information includes a spare field in a MIB, a reserved field in an additional PBCH payload, or an cellBarred field in the MIB, and the second indication information is included in a reserved field in DCI or the second indication information is included in a SIB1 information block; or the first indication information is included in a reserved field in DCI or the first indication information is included in a SIB1 information block, and the second indication information includes a spare field in a MIB, a reserved field in an additional PBCH payload, or an cellBarred field in the MIB, where the DCI is used for scheduling the SIB1. In a possible implementation, the REDCAP terminal includes the third-type REDCAP terminal; and the first information includes third indication information, where the third indication information indicates whether the third-type REDCAP terminal is allowed to access the communication apparatus.

In a possible implementation, the third indication information includes a spare field in a MIB; or the third indication information includes an cellBarred field in the MIB.

In a possible implementation, the first information is included in an SSB, and the SSB includes the MIB and the additional PBCH payload.

In a possible implementation, the third indication information is included in a reserved field in DCI, or the third indication information is included in a SIB1 information block.

In a possible implementation, the first information indicates that the first-type REDCAP terminal, the second-type REDCAP terminal, or the third-type REDCAP terminal is allowed to access the communication apparatus, or the first information indicates that the first-type REDCAP terminal and the second-type REDCAP terminal are allowed to access the communication apparatus. The transceiver module 1202 is configured to receive second information from the terminal apparatus, where the second information indicates that the terminal apparatus is the first-type REDCAP terminal, the second-type REDCAP terminal, or the third-type REDCAP terminal.

In a possible implementation, the second information is carried on a PRACH, a resource of the PRACH corresponds to the first-type REDCAP terminal, the second-type REDCAP terminal, or the third-type REDCAP terminal, and the resource of the PRACH includes at least one of the following: a time domain resource of the PRACH, a frequency domain resource of the PRACH, or a code domain resource of the PRACH; or the second information is carried in a Msg3, a MsgA, or RRC signaling.

In a possible implementation, the first information indicates that the first-type REDCAP terminal and the second-type REDCAP terminal are allowed to access the communication apparatus. The transceiver module 1202 is further configured to receive second information from the terminal apparatus, where the second information indicates that the terminal apparatus is a REDCAP terminal. The transceiver module 1202 is further configured to receive third information from the communication apparatus, where the third information indicates that the terminal apparatus is the first-type REDCAP terminal or the second-type REDCAP terminal.

In a possible implementation, the second information is carried on a PRACH, a resource of the PRACH corresponds to the REDCAP terminal, and the resource of the PRACH includes at least one of the following: a time domain resource of the PRACH, a frequency domain resource of the PRACH, or a code domain resource of the PRACH; and the third information is carried in a Msg3, a MsgA, or RRC signaling.

For another function that can be implemented by the network device 120, refer to related descriptions of the embodiment shown in FIG. 6, the method embodiment shown in FIG. 7, or the embodiment shown in FIG. 8. Details are not described again.

Figure 13:
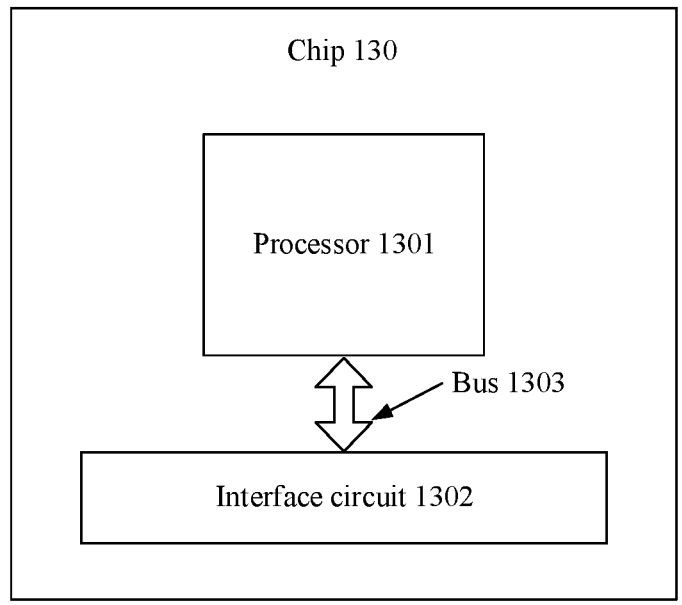
FIG. 13 is a schematic diagram of a structure of a chip according to an embodiment of this application.

FIG. 13 is a schematic diagram of a structure of a chip according to an embodiment of this application. The chip 130 includes one or more processors 1301 and an interface circuit 1302. Optionally, the chip 130 may further include a bus 1303.

The processor 1301 may be an integrated circuit chip and has a signal processing capability. In an implementation process, steps of the foregoing methods may be completed by using an integrated logic circuit of hardware in the processor 1301 or instructions in a form of software. The processor 1301 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods and steps that are disclosed in embodiments of this application. The general-purpose processor may be a microprocessor, or the processor may be any conventional processor or the like.

The interface circuit 1302 is configured to send or receive data, instructions, or information. The processor 1301 may perform processing by using the data, the instructions, or other information received by the interface circuit 1302, and may send processed information by using the interface circuit 1302.

Optionally, the chip 130 further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip 130 may be used in the communication apparatus (including the terminal apparatus or the network device) in embodiments of this application. Optionally, the interface circuit 1302 may be configured to output an execution result of the processor 1301. For the communication method provided in one or more embodiments of this application, refer to the foregoing embodiments. Details are not described herein again.

It should be noted that functions corresponding to each of the processor 1301 and the interface circuit 1302 may be implemented by using a hardware design, may be implemented by using a software design, or may be implemented by combining software and hardware. This is not limited herein.

Figure 14:
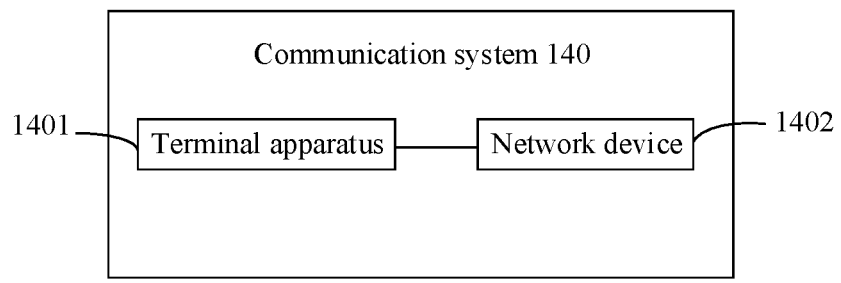
FIG. 14 is a schematic diagram of composition of a communication system according to an embodiment of this application.

FIG. 14 is a schematic diagram of composition of a communication system. As shown in FIG. 14, the communication system 140 may include a terminal apparatus 1401 and a network device 1402. It should be noted that FIG. 14 is merely an example accompanying drawing, and network elements included in the communication system 140 shown in FIG. 14 and a number of the network elements are not limited in this embodiment of this application.

The terminal apparatus 1401 has a function of the communication apparatus shown in FIG. 9, and may be configured to: receive, from the network device 1402, first information indicating whether a first-type REDCAP terminal and a second-type REDCAP terminal are allowed to access the network device 1402, and determine, based on the first information, whether to access the network device 1402.

The network device 1402 has a function of the communication apparatus shown in FIG. 10, and may be configured to: determine first information indicating whether the first-type REDCAP terminal and the second-type REDCAP terminal are allowed to access the network device 1402, and send the first information to the terminal apparatus 1401.

Alternatively, the terminal apparatus has a function of the communication apparatus shown in FIG. 11, and may be configured to: receive, from the network device 1402, first information indicating whether a first-type REDCAP terminal and a second-type REDCAP terminal are allowed to access the network device 1402, or receive, from the network device 1402, first information indicating whether a third-type REDCAP terminal is allowed to access the network device 1402; and determine, based on the first information, whether to access the network device 1402.

The network device 1402 has a function of the communication apparatus shown in FIG. 12, and may be configured to: determine first information indicating whether the first-type REDCAP terminal and the second-type REDCAP terminal are allowed to access the network device 1402, or configured to determine first information indicating whether a third-type REDCAP terminal is allowed to access the network device 1402, and send the first information to the terminal apparatus 1401.

It should be noted that all related content of the steps in the foregoing method embodiments may be cited in function descriptions of corresponding network elements in the communication system 140. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method performed by a terminal apparatus or a chip in the terminal apparatus, wherein the method comprises:
receiving first information, wherein the first information indicates whether a first-type reduced capability (REDCAP) terminal and a second-type REDCAP terminal are allowed to access a network device, wherein the first-type REDCAP terminal and the second-type REDCAP terminal operate in a same frequency range, and a number of receive antennas of the second-type REDCAP terminal is less than a number of receive antennas of the first-type REDCAP terminal; and
determining based on the first information, whether to access the network device, wherein the terminal apparatus is the first-type REDCAP terminal or the second-type REDCAP terminal.

2. The method according to claim 1, wherein the first information comprises first indication information and second indication information, wherein the first indication information indicates whether the first-type REDCAP terminal is allowed to access the network device, and wherein the second indication information indicates whether the second-type REDCAP terminal is allowed to access the network device.

3. The method according to claim 2, wherein the first indication information and the second indication information are comprised in a system information block Type1 (SIB1).

4. The method according to claim 1, wherein the first information indicates that the first-type REDCAP terminal and the second-type REDCAP terminal are allowed to access the network device, and wherein the method further comprises:
sending second information to the network device, wherein the second information indicates that the terminal apparatus is a REDCAP terminal; and
sending third information to the network device, wherein the third information indicates that the terminal apparatus is the first-type REDCAP terminal or the second-type REDCAP terminal.

5. The method according to claim 4, wherein the second information is carried on a physical random access channel (PRACH), wherein a resource of the PRACH corresponding to the REDCAP terminal comprises at least one of a time domain resource of the PRACH, a frequency domain resource of the PRACH, or a code domain resource of the PRACH, and wherein the third information is carried in a Msg3, a MsgA, or RRC signaling.

6. The method according to claim 1, wherein the number of receive antennas of the second-type REDCAP terminal is 1, and wherein the number of receive antennas of the first-type REDCAP terminal is 2.

7. A method performed by a network device or a chip in the network device, wherein the method comprises:
determining first information, wherein the first information indicates whether a first-type reduced capability (REDCAP) terminal and a second-type REDCAP terminal are allowed to access a network device, wherein the first-type REDCAP terminal and the second-type REDCAP terminal operate in a same frequency range, and a number of receive antennas of the second-type REDCAP terminal is less than that of a number of receive antennas of the first-type REDCAP terminal; and
sending the first information to a terminal apparatus.

8. The method according to claim 7, wherein the first information comprises first indication information and second indication information, wherein the first indication information indicates whether the first-type REDCAP terminal is allowed to access the network device, and wherein the second indication information indicates whether the second-type REDCAP terminal is allowed to access the network device.

9. The method according to claim 8, wherein the first indication information and the second indication information are comprised in a system information block Type1 (SIB1).

10. The method according to claim 7, wherein the first information indicates that the first-type REDCAP terminal and the second-type REDCAP terminal are allowed to access the network device, and wherein the method further comprises:
receiving second information from the terminal apparatus, wherein the second information indicates that the terminal apparatus is a REDCAP terminal; and
receiving third information from the terminal apparatus, wherein the third information indicates that the terminal apparatus is the first-type REDCAP terminal or the second-type REDCAP terminal.

11. The method according to claim 10, wherein the second information is carried on a physical random access channel (PRACH), wherein a resource of the PRACH corresponding to the REDCAP terminal comprises at least one of a time domain resource of the PRACH, a frequency domain resource of the PRACH, or a code domain resource of the PRACH, and wherein the third information is carried in a Msg3, a MsgA, or RRC signaling.

12. The method according to claim 7, wherein the number of receive antennas of the second-type REDCAP terminal is 1, and wherein the number of receive antennas of the first-type REDCAP terminal is 2.

13. An apparatus, comprising:
a memory storage storing instructions; and
one or more processors coupled to the memory storage, wherein the instructions, when executed by the one or more processors, cause the apparatus to perform operations comprising:
receiving first information, wherein the first information indicates whether a first-type reduced capability (REDCAP) terminal and a second-type REDCAP terminal are allowed to access a network device, wherein the first-type REDCAP terminal and the second-type REDCAP terminal operate in a same frequency range, and a number of receive antennas of the second-type REDCAP terminal is less than a number of receive antennas of the first-type REDCAP terminal; and
determining based on the first information, whether to access the network device, wherein the apparatus belongs to the first-type REDCAP terminal or the second-type REDCAP terminal.

14. The apparatus according to claim 13, wherein the first information comprises first indication information and second indication information, wherein the first indication information indicates whether the first-type REDCAP terminal is allowed to access the network device, and wherein the second indication information indicates whether the second-type REDCAP terminal is allowed to access the network device.

15. The apparatus according to claim 14, wherein the first indication information and the second indication information are comprised in a system information block Type1 (SIB1).

16. The apparatus according to claim 13, wherein the first information indicates that the first-type REDCAP terminal and the second-type REDCAP terminal are allowed to access the network device, and wherein the operations further comprising:
sending second information to the network device, wherein the second information indicates that the apparatus belongs to a REDCAP terminal; and
sending third information to the network device, wherein the third information indicates that the apparatus belongs to the first-type REDCAP terminal or the second-type REDCAP terminal.

17. The apparatus according to claim 16, wherein the second information is carried on a physical random access channel (PRACH), wherein a resource of the PRACH corresponding to the REDCAP terminal comprises at least one of a time domain resource of the PRACH, a frequency domain resource of the PRACH, or a code domain resource of the PRACH, and wherein the third information is carried in a Msg3, a MsgA, or RRC signaling.

18. The apparatus according to claim 13, wherein the number of receive antennas of the second-type REDCAP terminal is 1, and wherein the number of receive antennas of the first-type REDCAP terminal is 2.

19. An apparatus, comprising:
a memory storage storing instructions; and
one or more processors coupled to the memory storage, wherein the instructions, when executed by the one or more processors, cause the apparatus to perform operations comprising:
determining first information, wherein the first information indicates whether a first-type reduced capability (REDCAP) terminal and a second-type REDCAP terminal are allowed to access a network device, wherein the first-type REDCAP terminal and the second-type REDCAP terminal operate in a same frequency range, and a number of receive antennas of the second-type REDCAP terminal is less than a number of receive antennas of the first-type REDCAP terminal; and
sending the first information to a terminal apparatus.

20. The apparatus according to claim 19, wherein the first information comprises first indication information and second indication information, wherein the first indication information indicates whether the first-type REDCAP terminal is allowed to access the network device, and wherein the second indication information indicates whether the second-type REDCAP terminal is allowed to access the network device.

21. The apparatus according to claim 20, wherein the first indication information and the second indication information are comprised in a system information block Type1 (SIB1).

22. The apparatus according to claim 19, wherein the first information indicates that the first-type REDCAP terminal and the second-type REDCAP terminal are allowed to access the network device, and wherein the operations further comprising:
receive second information from the terminal apparatus, wherein the second information indicates that the terminal apparatus is a REDCAP terminal; and
receive third information from the terminal apparatus, wherein the third information indicates that the terminal apparatus is the first-type REDCAP terminal or the second-type REDCAP terminal.

23. The apparatus according to claim 22, wherein the second information is carried on a physical random access channel (PRACH), wherein a resource of the PRACH corresponding to the REDCAP terminal comprises at least one of a time domain resource of the PRACH, a frequency domain resource of the PRACH, or a code domain resource of the PRACH, and wherein the third information is carried in a Msg3, a MsgA, or RRC signaling.

24. The apparatus according to claim 19, wherein the number of receive antennas of the second-type REDCAP terminal is 1, and wherein the number of receive antennas of the first-type REDCAP terminal is 2.

* * * * *